(12) United States Patent
Tanaka et al.

(10) Patent No.: US 11,736,829 B2
(45) Date of Patent: Aug. 22, 2023

(54) IMAGING APPARATUS AND IMAGING SENSOR

(71) Applicant: FUJIFILM Corporation, Tokyo (JP)

(72) Inventors: Koichi Tanaka, Saitama (JP); Tomoyuki Kawai, Saitama (JP); Junya Kitagawa, Saitama (JP); Yuya Nishio, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/892,127

(22) Filed: Aug. 22, 2022

(65) Prior Publication Data

US 2022/0408042 A1 Dec. 22, 2022

Related U.S. Application Data

(63) Continuation of application No. PCT/JP2021/000900, filed on Jan. 13, 2021.

(30) Foreign Application Priority Data

Feb. 28, 2020 (JP) ................................ 2020-034192

(51) Int. Cl.
*H04N 25/704* (2023.01)
*G02B 7/34* (2021.01)

(52) U.S. Cl.
CPC ............. *H04N 25/704* (2023.01); *G02B 7/34* (2013.01)

(58) Field of Classification Search
CPC ...... H04N 25/704; H04N 25/46; H04N 23/00; H04N 23/60; H04N 25/445; G02B 7/34; G03B 13/36

See application file for complete search history.

(56) References Cited

U.S. PATENT DOCUMENTS 10,015,405 B2 7/2018 Kawai et al.
10,277,830 B2 * 4/2019 Sano ................... H04N 23/672

(Continued)

FOREIGN PATENT DOCUMENTS

| JP | 2011101325 | 5/2011 |
| JP | 2015128215 | 7/2015 |
| WO | 2015111269 | 7/2015 |

OTHER PUBLICATIONS

"International Search Report (Form PCT/ISA/210) of PCT/JP2021/000900," dated Apr. 6, 2021, with English translation thereof, pp. 1-5.

(Continued)

*Primary Examiner* — Gevell V Selby
(74) *Attorney, Agent, or Firm* — JCIPRNET

(57) ABSTRACT

The pixel region includes a first phase difference pixel group including a plurality of the phase difference pixels of which the first side of the photoelectric conversion element is blocked by the light blocking layer in a first side region of the first side, and a second phase difference pixel group including a plurality of the phase difference pixels of which the second side of the photoelectric conversion element is blocked by the light blocking layer. The first phase difference pixel group includes a first A pixel and a first B pixel in which a light blocking area of the photoelectric conversion element using the light blocking layer is smaller than that of the first A pixel. The controller performs addition readout processing in which at least one of a pixel signal of the first A pixel or a pixel signal of the first B pixel is weighted in accordance with optical characteristics of the imaging lens.

20 Claims, 21 Drawing Sheets

(56) References Cited

U.S. PATENT DOCUMENTS

| | | |
|---|---|---|
| 2011/0285899 A1 | 11/2011 | Hirose |
| 2015/0189249 A1 | 7/2015 | Hiyama et al. |
| 2016/0088245 A1* | 3/2016 | Nakata ................. H04N 25/134 |
| | | 257/432 |
| 2016/0316148 A1 | 10/2016 | Kawai et al. |
| 2019/0052823 A1* | 2/2019 | Jung ................. H01L 27/14645 |

OTHER PUBLICATIONS

"Written Opinion of the International Searching Authority (Form PCT/ISA/237)" of PCT/JP2021/000900, dated Apr. 6, 2021, with English translation thereof, pp. 1-6.

\* cited by examiner

| IMAGE HEIGHT H | PRINCIPAL RAY ANGLE $\theta$ | UPPER RAY ANGLE | LOWER RAY ANGLE |
|---|---|---|---|
| 0 | 0 | ... | ... |
| 0.1 | 0.91 | ... | ... |
| 0.2 | ... | ... | ... |
| 0.9 | 7.83 | ... | ... |
| 1 | 8.64 | ... | ... |

| ADDITION READOUT MODE | WEIGHT | | | | READOUT ROW ADDRESS (n = 0, 1, 2, ···) |
|---|---|---|---|---|---|
| | W0 | W1 | W2 | W3 | |
| M1 | 1 | 0 | 0 | 0 | 4n |
| M2 | 0 | 1 | 0 | 0 | 4n+1 |
| M3 | 0 | 0 | 1 | 0 | 4n+2 |
| M4 | 0 | 0 | 0 | 1 | 4n+3 |

| IMAGE HEIGHT H | PRINCIPAL RAY ANGLE $\theta$ | UPPER RAY ANGLE | LOWER RAY ANGLE |
|---|---|---|---|
| 0 | 0 | ... | ... |
| 0.1 | 0.91 | ... | ... |
| ... | ... | ... | ... |
| 0.9 | 7.83 | ... | ... |
| 1 | 8.64 | ... | ... |

$\theta p$

SELECT PIXEL LINE HAVING CLOSEST PERIPHERAL RAY ANGLE

| PIXEL LINE | OPTICAL CHARACTERISTICS | PERIPHERAL PRINCIPAL RAY ANGLE |
|---|---|---|
| LA | FIRST OPTICAL CHARACTERISTIC | $\theta 1$ |
| LB | SECOND OPTICAL CHARACTERISTIC | $\theta 2$ |
| LC | THIRD OPTICAL CHARACTERISTIC | $\theta 3$ |

| ADDITION READOUT MODE | WEIGHT | | | | READOUT ROW ADDRESS (n = 0, 1, 2, ...) |
|---|---|---|---|---|---|
| | W0 | W1 | W2 | W3 | |
| M1 | 1 | 0 | 0 | 0 | 4n |
| M2 | 0 | 1 | 0 | 0 | 4n+1 |
| M3 | 0 | 0 | 1 | 0 | 4n+2 |
| M4 | 0 | 0 | 0 | 1 | 4n+3 |

| FOCAL LENGTH (mm) | PERIPHERAL RAY ANGLE $\theta_p$ |
|---|---|
| 10 | ... |
| 24 | ... |
| 50 | ... |
| ... | ... |
| 200 | ... |

IMAGING APPARATUS AND IMAGING SENSOR

CROSS-REFERENCE TO RELATED APPLICATION

This application is a continuation application of International Application No. PCT/JP2021/000900, filed Jan. 13, 2021, the disclosure of which is incorporated herein by reference in its entirety. Further, this application claims priority from Japanese Patent Application No. 2020-034192 filed on Feb. 28, 2020, the disclosure of which is incorporated herein by reference in its entirety.

BACKGROUND

1. Technical Field

The technique of the present disclosure relates to an imaging apparatus and an imaging sensor.

2. Description of the Related Art

As the automatic focus detection method of the imaging apparatus, there are a contrast detection method and a phase difference detection method. In the phase difference detection method, the luminous flux that has passed through the exit pupil of the imaging lens is divided into two parts, and the divided luminous flux is received by a pair of phase difference pixels (also referred to as focus detection pixels).

JP2011-101325A discloses an imaging apparatus having a plurality of types of phase difference pixels having different light receiving distributions in addition to the plurality of imaging pixels. The imaging apparatus described in JP2011-101325A is able to select one thinning-out readout mode from a plurality of thinning-out readout modes having different thinning phases in a case where a plurality of pixels are thinned out and read out. For the plurality of types of phase difference pixels, only the signal of one type of phase difference pixel is read out in accordance with the selected thinning-out readout mode.

SUMMARY

One embodiment according to the technique of the present disclosure provides an imaging apparatus and an imaging sensor capable of performing focusing control using a pixel signal of an appropriate phase difference pixel according to optical characteristics of the imaging lens.

In order to achieve the above object, according to an aspect of the present disclosure, there is provided an imaging apparatus comprising: a pixel region in which a plurality of pixels are arranged and into which light is incident through an imaging lens; and a controller that controls readout of a pixel signal from the pixel region. In the pixel region, phase difference pixels, each of which includes a photoelectric conversion element, and a light blocking layer, which blocks a part of light incident on the photoelectric conversion element, are arranged along a first direction. In a case where one side in the first direction is set as a first side and the other side is set as a second side, the pixel region includes a first phase difference pixel group including a plurality of the phase difference pixels of which the first side of the photoelectric conversion element is blocked by the light blocking layer in a first side region of the first side, and a second phase difference pixel group including a plurality of the phase difference pixels of which the second side of the photoelectric conversion element is blocked by the light blocking layer, and the first phase difference pixel group includes a first A pixel and a first B pixel in which a light blocking area of the photoelectric conversion element using the light blocking layer is smaller than that of the first A pixel. The controller performs addition readout processing in which at least one of a pixel signal of the first A pixel or a pixel signal of the first B pixel is weighted in accordance with optical characteristics of the imaging lens.

It is preferable that the second phase difference pixel group includes a second A pixel and a second B pixel in which a light blocking area of the photoelectric conversion element using the light blocking layer is larger than that of the second A pixel, and the controller performs addition readout processing in which either one of a set of the first A pixel and the second A pixel or a set of the first B pixel and the second B pixel is weighted in accordance with the optical characteristics of the imaging lens.

It is preferable that the pixel region has an A pixel line that includes the first A pixel and has a plurality of pixels arranged in the first direction, and a B pixel line that includes the first B pixel and has a plurality of pixels arranged in the first direction. It is preferable that the A pixel line and the B pixel line are arranged in a second direction intersecting with the first direction, and the controller performs addition readout processing in which either one of the A pixel line or the B pixel line is weighted in accordance with the optical characteristics of the imaging lens.

It is preferable that the first phase difference pixel group is also included in a central region located at a center of the pixel region with respect to the first direction, in the A pixel line, a light blocking area of the first A pixel which is included in the first side region is larger than a light blocking area of the first A pixel which is included in the central region, and in the B pixel line, a light blocking area of the first B pixel which is included in the first side region is equal to a light blocking area of the first B pixel which is included in the central region.

It is preferable that the light blocking area of a plurality of the first A pixels which are included in the A pixel line is smaller at a position closer to the central region than the first side region.

It is preferable that the A pixel line and the B pixel line are adjacent to each other in the second direction.

It is preferable that in the pixel region, the phase difference pixels which are included in the first phase difference pixel group are formed in a second side region on the second side, and in the A pixel line, a light blocking area of the first A pixel which is included in the second side region is smaller than a light blocking area of the first A pixel which is included in the first side region.

It is preferable that the optical characteristics are an incidence angle of the light with respect to the pixel region, a focal length of the imaging lens, or a zoom magnification of the imaging lens.

It is preferable that the focal length of the imaging lens can be changed, and the controller changes the weight in a case where the focal length is changed and the change is stopped.

It is preferable that the controller acquires the optical characteristics from the imaging lens and determines the weight on the basis of the acquired optical characteristics.

It is preferable that in a case where the optical characteristics are unlikely to be acquired from the imaging lens, the controller determines the weight on the basis of an exposure amount of the light to the first A pixel and the first B pixel.

It is preferable that the second phase difference pixel group includes the second A pixel and the second B pixel having the same light blocking area as the first B pixel, and in a case where the optical characteristics of the imaging lens are unlikely to be acquired, the controller sets the weight for the set of the first A pixel and the second A pixel to zero.

It is preferable that the pixel region has a gate line that extends in the first direction and selects the photoelectric conversion element which reads out the pixel signal, and a signal line that extends in a second direction intersecting with the first direction and outputs a pixel signal from the photoelectric conversion element.

It is preferable that the addition readout processing includes thinning-out readout processing in which the weight is set to zero so that a pixel signal having a weight of zero is thinned out and a pixel signal whose weighting is not zero is read out.

According to an aspect of the present disclosure, there is provided an imaging sensor comprising: a pixel region in which a plurality of pixels are arranged. In the pixel region, phase difference pixels, each of which includes a photoelectric conversion element, and a light blocking layer, which blocks a part of light incident on the photoelectric conversion element, are arranged along a first direction, in a case where one side in the first direction is set as a first side and the other side is set as a second side, the pixel region includes a first phase difference pixel group including a plurality of the phase difference pixels of which the first side of the photoelectric conversion element is blocked by the light blocking layer in a first side region of the first side, and a second phase difference pixel group including a plurality of the phase difference pixels of which the second side of the photoelectric conversion element is blocked by the light blocking layer, and the first phase difference pixel group includes a first A pixel and a first B pixel in which a light blocking area of the photoelectric conversion element using the light blocking layer is smaller than that of the first A pixel, and the second phase difference pixel group includes a second A pixel and a second B pixel in which a light blocking area of the photoelectric conversion element using the light blocking layer is larger than that of the second A pixel.

It is preferable that the pixel region includes an imaging pixel having a color filter and the photoelectric conversion element, the first A pixel and the second A pixel are arranged such that three or less of the imaging pixels are interposed therebetween, and the first B pixel and the second B pixel are arranged such that three or less of the imaging pixels are interposed therebetween.

It is preferable that the pixel region has an A pixel line that includes the first A pixel and has a plurality of pixels arranged in the first direction, and a B pixel line that includes the first B pixel and has a plurality of pixels arranged in the first direction, and the A pixel line and the B pixel line are arranged in a second direction intersecting with the first direction.

It is preferable that the first phase difference pixel group and the second phase difference pixel group are also arranged in a second side region on the second side of the pixel region, in the second side region, a light blocking area of the first A pixel is smaller than a light blocking area of the first B pixel, and in the second side region, a light blocking area of the second A pixel is larger than a light blocking area of the second B pixel.

It is preferable that in the first side region, the first phase difference pixel group includes a first C pixel in which a light blocking area of the photoelectric conversion element using the light blocking layer is smaller than that of the first B pixel, and in the first side region, the second phase difference pixel group includes a second C pixel in which a light blocking area of the photoelectric conversion element using the light blocking layer is larger than that of the second B pixel.

It is preferable that the pixel region has a gate line that extends in the first direction and selects the photoelectric conversion element which reads out the pixel signal, and a signal line that extends in a second direction intersecting with the first direction and outputs a pixel signal from the photoelectric conversion element.

BRIEF DESCRIPTION OF THE DRAWINGS

Exemplary embodiments according to the technique of the present disclosure will be described in detail based on the following figures, wherein:

FIG. 8 is a diagram showing a relationship between an addition readout mode and a weight, FIG. 18 is a diagram showing a procedure for selecting an addition readout mode on the basis of lens information.

DETAILED DESCRIPTION

An example of an embodiment relating to the technique of the present disclosure will be described with reference to the accompanying drawings.

First, the wording used in the following description will be described.

In the following description, the "CPU" is an abbreviation for "Central Processing Unit". The "ROM" is an abbreviation for "Read Only Memory". The "RAM" is an abbreviation for "Random Access Memory". The "CMOS" is an abbreviation for "Complementary Metal Oxide Semiconductor". The "FPGA" is an abbreviation for "Field-Programmable Gate Array". The "PLD" is an abbreviation for "Programmable Logic Device". The "ASIC" is an abbreviation for "Application Specific Integrated Circuit".

In the present disclosure, as used herein, the term "parallel" refers to parallelism in the sense that, in addition to perfect parallelism, errors generally tolerated in the art of the technique of the present disclosure. As used herein, the term "equal" includes not only being exactly equal, but also being substantially equal in the sense that it includes errors that are generally tolerated in the art of the technique of this disclosure.

First Embodiment

As a first embodiment of the imaging apparatus, the technique of the present disclosure will be described by using an interchangeable lens digital camera as an example.

Figure 1:
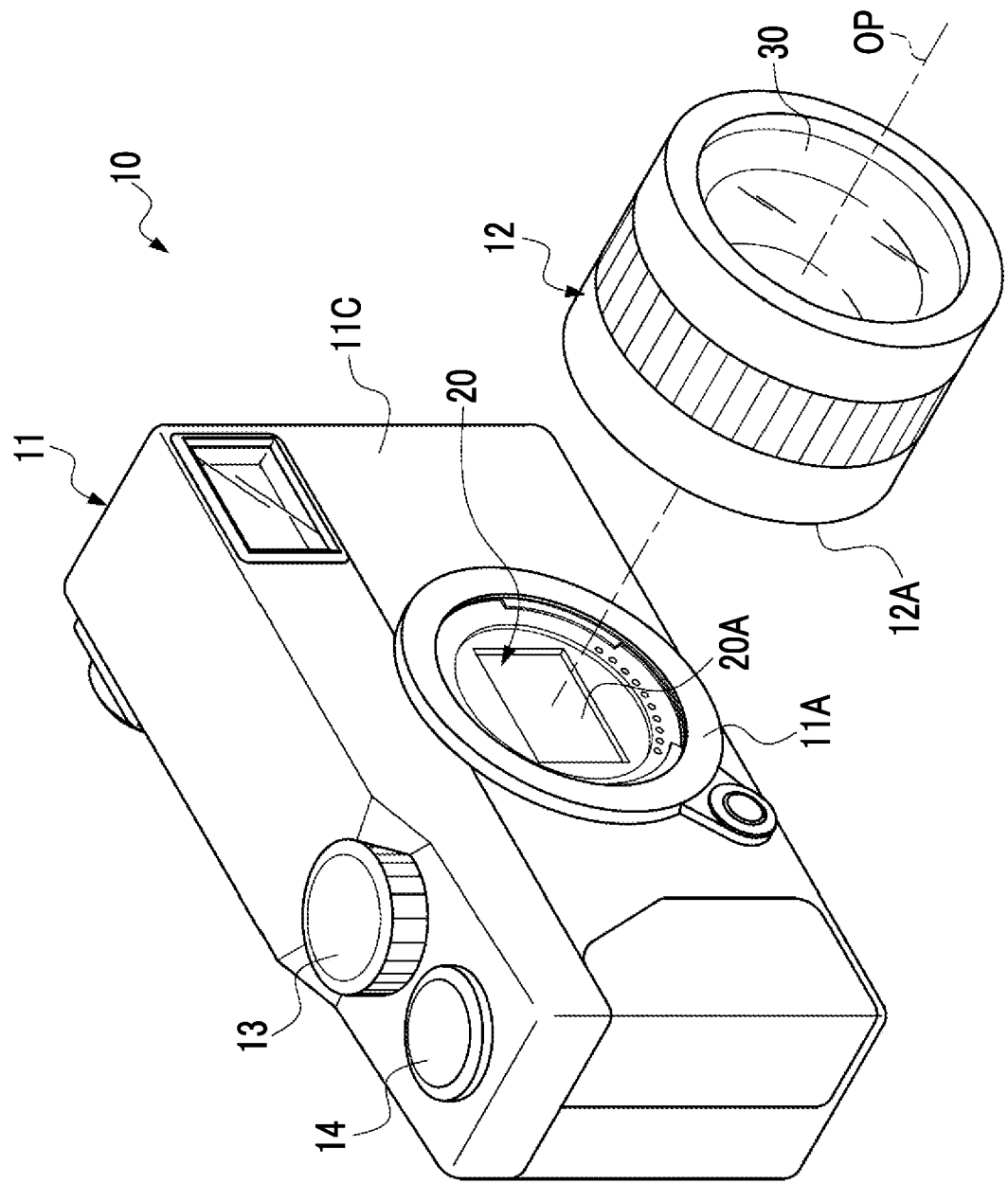
FIG. 1 is a schematic perspective view showing a front side of an imaging apparatus.

As shown in FIG. 1, the imaging apparatus 10 is a interchangeable lens digital camera. The imaging apparatus 10 includes a body 11 and an imaging lens 12 interchangeably attached to the body 11.

A camera side mount 11A is provided on a front surface 11C of the body 11. The imaging lens 12 is provided with a lens side mount 12A on the rear end side. By attaching the lens side mount 12A to the camera side mount 11A, the imaging lens 12 is connected to the body 11.

In the present embodiment, the imaging lens 12 is a single focus lens having a fixed focal length. A plurality of types of imaging lenses 12 having different focal lengths can be attached to the body 11.

The body 11 is provided with an imaging sensor 20. In the imaging sensor 20, the light-receiving surface 20A is exposed from an opening of the camera side mount 11A. In a case where the imaging lens 12 is attached to the body 11, the luminous flux from the subject passes through the imaging lens 12 and is imaged on the light-receiving surface 20A of the imaging sensor 20. The imaging sensor 20 captures an image of the luminous flux formed on the light-receiving surface 20A and generates an imaging signal.

A dial 13 and a release button 14 are provided on an upper surface of the body 11. The dial 13 is operated in a case of setting the operation mode or the like. The operation mode of the imaging apparatus 10 includes, for example, a still image capturing mode and a motion picture capturing mode. The release button 14 is operated in a case of starting imaging in the still image capturing mode or the motion picture capturing mode.

Figure 2:
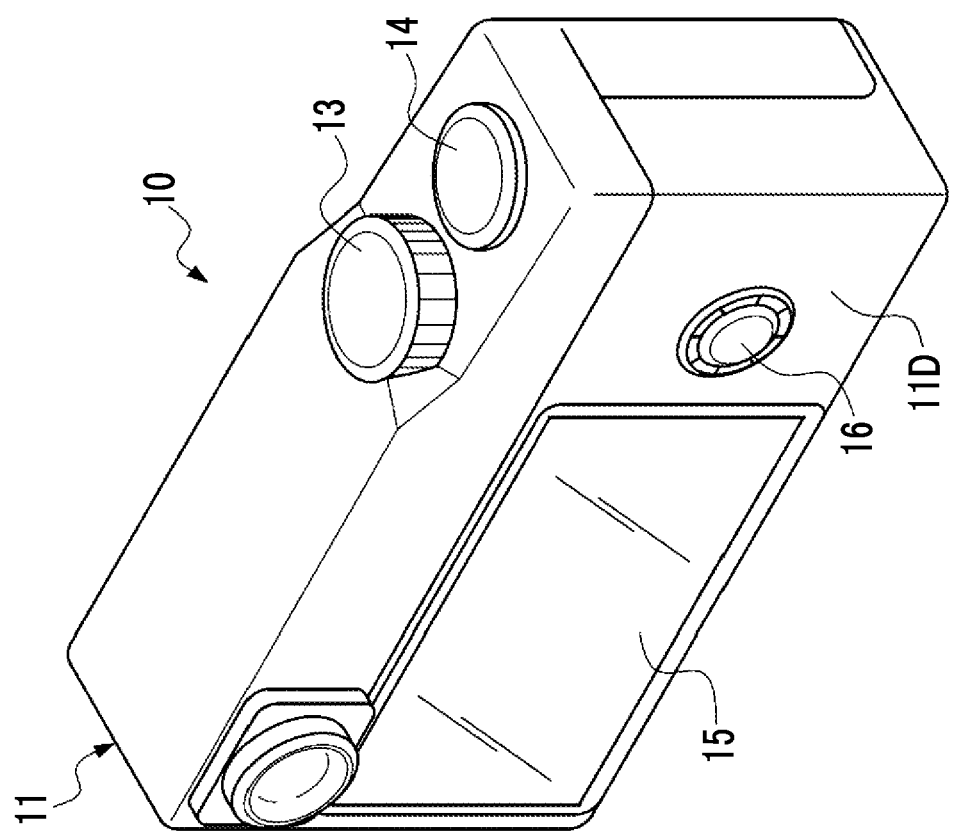
FIG. 2 is a schematic perspective view showing a rear side of the imaging apparatus.

As shown in FIG. 2, a display 15 and an instruction key 16 are provided on a rear surface 11D of the body 11. The display 15 displays an image based on image data obtained by imaging, various menu screens, and the like.

The instruction key 16 receives various instructions. Here, the "various instructions" are, for example, an instruction to display a menu screen on which various menus can be selected, an instruction to select one or a plurality of menus, an instruction to confirm the selected contents, an instruction to delete the selected contents, and various instructions such as autofocus mode, manual focus mode, and frame advance. In addition, the body 11 is provided with a power switch and the like.

Figure 3:
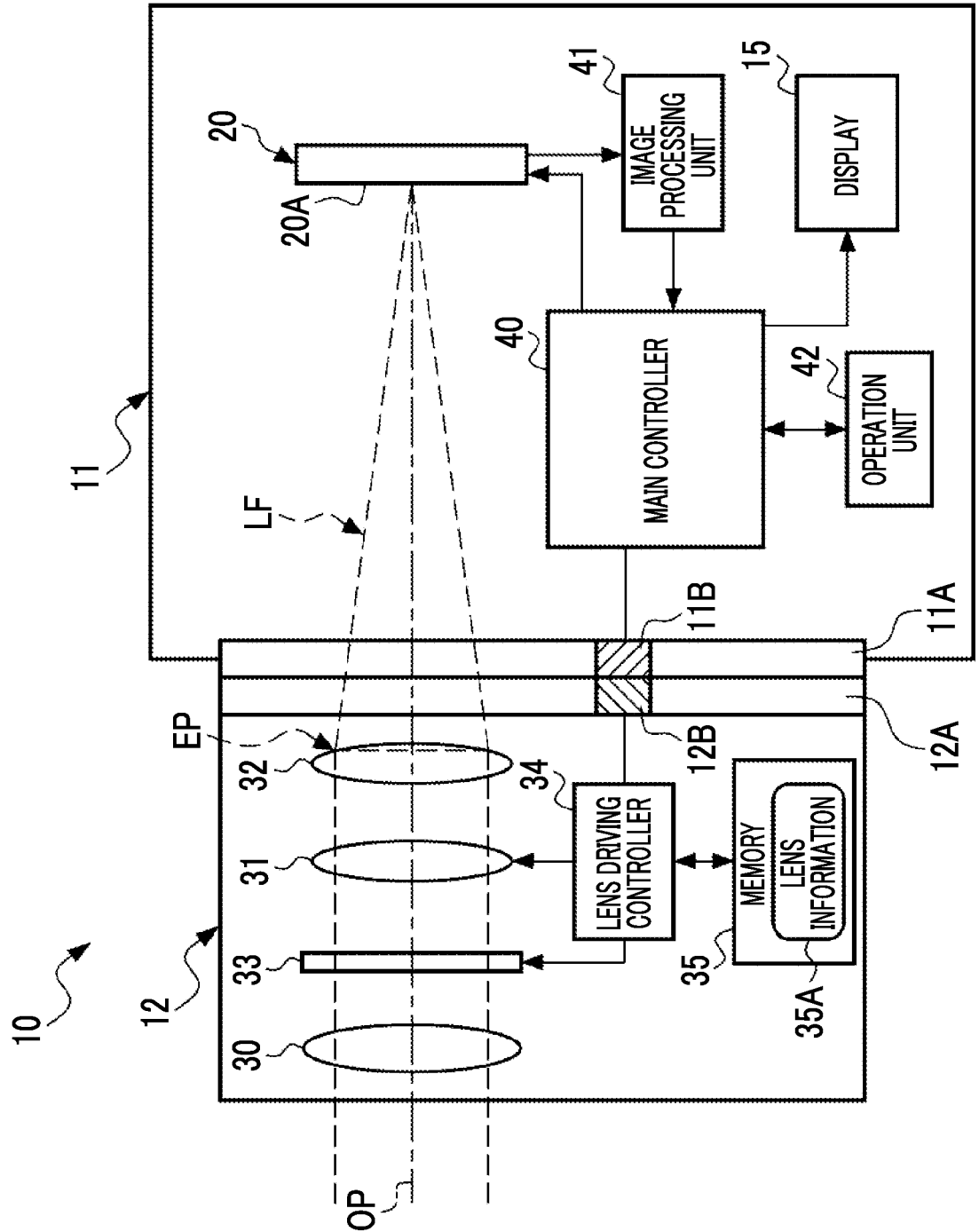
FIG. 3 is a schematic view showing an internal configuration of the imaging apparatus.

FIG. 3 shows an internal configuration of the imaging apparatus 10 in a state where the imaging lens 12 is attached to the body 11. The body 11 and the imaging lens 12 are electrically connected to each other by bringing the electric contact 11B provided on the camera side mount 11A into contact with the electric contact 12B provided on the lens side mount 12A.

The imaging lens 12 includes an objective lens 30, a focus lens 31, a rear end lens 32, and a stop 33. Each member is disposed in the order of the objective lens 30, the stop 33, the focus lens 31, and the rear end lens 32 from the objective side along an optical axis OP of the imaging lens 12. The objective lens 30, the focus lens 31, and the rear end lens 32 constitute an imaging optical system. The type, number, and arrangement order of the lenses constituting the imaging optical system are not limited to the example shown in FIG. 3.

Further, the imaging lens 12 has a lens driving controller 34 and a memory 35. The lens driving controller 34 is constituted of a CPU, RAM, ROM, and the like. The lens driving controller 34 is electrically connected to the main controller 40 in the body 11 through the electric contact 12B and the electric contact 11B.

The lens driving controller 34 drives the focus lens 31 and the stop 33 on the basis of the control signal transmitted from the main controller 40. The lens driving controller 34 controls driving of the focus lens 31 on the basis of the control signal for focusing control transmitted from the main controller 40 in order to adjust the focusing position of the imaging lens 12. The main controller 40 performs focusing control by a phase difference method.

The stop 33 has an opening of which an opening diameter is variable about the optical axis OP. The lens driving controller 34 controls driving of the stop 33 on the basis of the stop adjustment control signal transmitted from the main controller 40 in order to adjust the light amount incident on the light-receiving surface 20A of the imaging sensor 20.

The memory 35 is a non-volatile memory such as a flash memory. The memory 35 stores lens information 35A about the optical characteristics of the imaging lens 12. The lens information 35A is information that differs depending on the type of the imaging lens 12. The lens information 35A includes information about the incidence angle of the principal ray (hereinafter referred to as the principal ray angle) with respect to the light-receiving surface 20A of the imaging sensor 20.

The body 11 includes the imaging sensor 20, the main controller 40, an image processing unit 41, an operation unit 42, and the display 15. The main controller 40 controls operations of the imaging sensor 20, the image processing unit 41, the operation unit 42, and the display 15. The main controller 40 is constituted of a CPU, RAM, ROM, and the like.

The imaging sensor 20 is, for example, a CMOS type imaging sensor. The imaging sensor 20 is disposed such that the optical axis OP is orthogonal to the light-receiving surface 20A and the optical axis OP is located at the center of the light-receiving surface 20A. A luminous flux LF that has passed through the exit pupil EP of the imaging lens 12 is incident on the light-receiving surface 20A. A plurality of pixels that generate pixel signals by performing photoelectric conversion are formed on the light-receiving surface 20A. The imaging sensor 20 generates an imaging signal constituted of pixel signals of each pixel by photoelectrically converting the light incident on each pixel.

The image processing unit 41 generates image data in a default file format (for example, JPEG format) by performing various kinds of image processing on the imaging signal. The display 15 displays an image on the basis of the image data generated by the image processing unit 41. The image includes a still image, a motion picture, and a live view image. The live view image is an image that is displayed in real time on the display 15 by sequentially outputting the image data, which is generated by the image processing unit 41, to the display 15.

The image data, which is generated by the image processing unit 41, can be stored in an internal memory (not shown) built in the body 11 or a storage medium (memory card or the like) that can be attached to and detached from the body 11.

The operation unit 42 includes the dial 13, the release button 14, and the instruction key 16 (refer to FIGS. 1 and 2) described above. The main controller 40 controls each unit in the body 11 and the lens driving controller 34 in the imaging lens 12 in accordance with the operation of the operation unit 42.

Further, in a case where the imaging lens 12 is connected to the body 11, the main controller 40 acquires the lens information 35A stored in the memory 35 through the lens driving controller 34. In the present embodiment, the main controller 40 performs focusing control by a phase difference method on the basis of the principal ray angle information which is included in the lens information 35A.

Figures 4, 5:
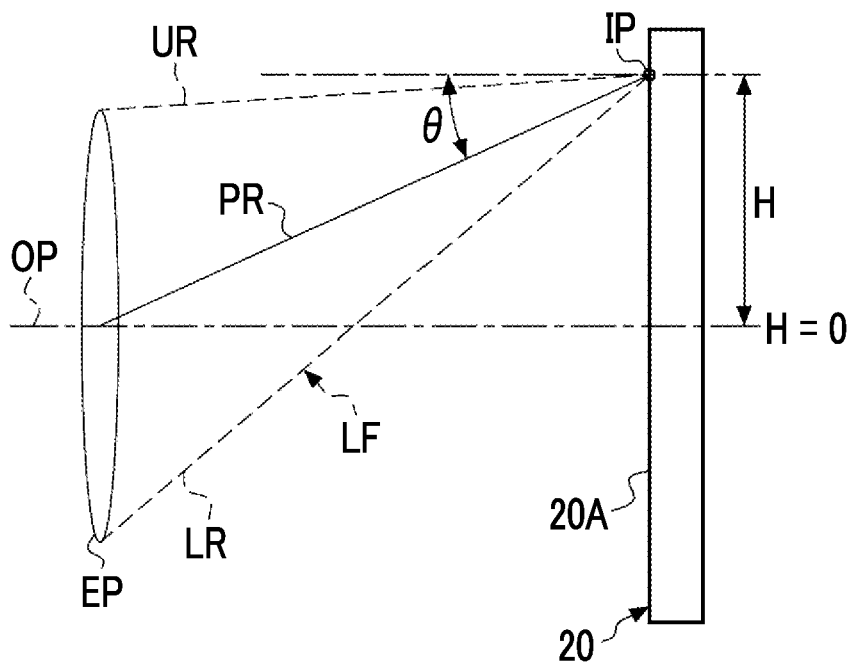
FIG. 4 is a diagram showing an example of lens information.
FIG. 5 is a schematic diagram showing a principal ray angle.

FIG. 4 is an example of the lens information 35A which is stored in the memory 35. In the lens information 35A, a principal ray angle θ is recorded as a numerical value representing a relationship with an image height H. The lens information 35A may include an upper ray angle, a lower ray angle, and the like in addition to the principal ray angle θ. These information are unique to the imaging lens 12 and can be obtained from the design data of the imaging optical system.

FIG. 5 is a schematic diagram showing the principal ray angle θ. As shown in FIG. 5, the principal ray angle θ is an angle formed by the principal ray PR passing through the center of the exit pupil EP and the normal line of the light-receiving surface 20A at an image formation point IP. The image height H represents a distance from the optical axis OP to the image formation point IP.

The principal ray angle θ is "0" in a case where the image formation point IP coincides with the center of the light-receiving surface 20A (that is, in a case where H=0). The principal ray angle θ increases as the image formation point IP moves away from the center of the light-receiving surface 20A (that is, the image height H increases). The reference numeral UR in FIG. 5 represents the upper ray, and the reference numeral LR represents the lower ray.

Figure 6:
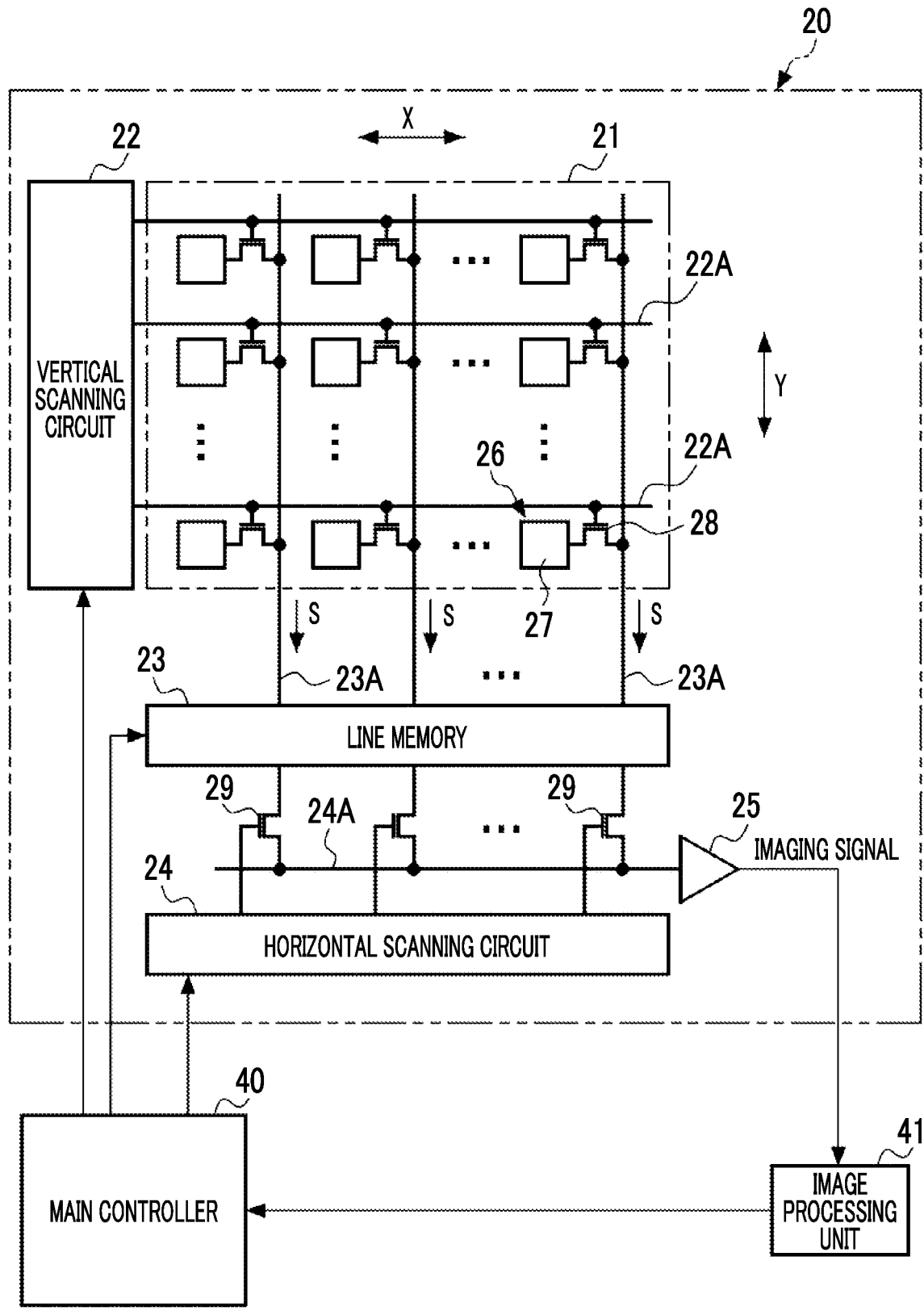
FIG. 6 is a diagram showing a configuration example of an imaging sensor.

FIG. 6 shows an example of the configuration of the imaging sensor 20. The imaging sensor 20 includes a pixel region 21, a vertical scanning circuit 22, a line memory 23, a horizontal scanning circuit 24, and an output amplifier 25. In the pixel region 21, a plurality of pixels 26 are arranged in a two-dimensional matrix along the X direction and the Y direction. The pixel 26 includes a photoelectric conversion element 27 that converts incident light into a signal charge and stores the signal charge. The photoelectric conversion element 27 is constituted of a photodiode. Further, the pixel 26 includes an amplifier that converts a signal charge into a voltage signal (hereinafter, referred to as a pixel signal), a reset switch, and the like. The pixel 26 outputs a pixel signal S according to the light amount of incident light.

Here, the Y direction is orthogonal to the X direction. The X direction is an example of the "first direction" according to the technique of the present disclosure. The Y direction is an example of the "second direction" according to the technique of the present disclosure.

A plurality of gate lines 22A, which extend in the X direction, are connected to the vertical scanning circuit 22. A plurality of signal lines 23A, which extend in the Y direction, are connected to the line memory 23. The plurality of gate lines 22A and the plurality of signal lines 23A intersect with each other in the pixel region 21. Each pixel 26 is provided at a position where the gate line 22A and the signal line 23A intersect with each other. Each pixel 26 is connected to the signal line 23A through a transistor 28 as a switch. The gate electrode of the transistor 28 is connected to the gate line 22A.

The pixels 26 in the pixel region 21 are selected line by line by the selection signal given to the gate line 22A from the vertical scanning circuit 22. In a case where the selection signal is given to the gate line 22A by the vertical scanning circuit 22, the pixel signal S is output from each pixel 26 connected to the gate line 22A to the signal line 23A. Hereinafter, a plurality of pixels 26 arranged in the X direction may be simply referred to as "row".

The line memory 23 stores the pixel signal S output from the pixel 26 for one line. The line memory 23 is constituted of a capacitor or the like. The line memory 23 is connected to the horizontal output line 24A through a transistor 29 as a switch. The output amplifier 25 is connected to the end of the horizontal output line 24A. The horizontal scanning circuit 24 sequentially outputs the pixel signals S for one line stored in the line memory 23 to the horizontal output line 24A by performing horizontal scanning in which the transistors 29 are sequentially selected. The pixel signal S, which is output to the horizontal output line 24A, is output to the external image processing unit 41 as an imaging signal through the output amplifier 25.

The main controller 40 controls operations of the vertical scanning circuit 22, the line memory 23, and the horizontal scanning circuit 24. By controlling the vertical scanning circuit 22, the main controller 40 makes it possible to read out the pixel signal S by the "sequential readout method" or the "addition readout method". The sequential readout method is a method in which the pixel signal S is read out line by line by sequentially selecting the gate lines 22A in the Y direction.

The addition readout method is a method in which pixel signals S for a plurality of rows are added and read out in accordance with the weight by weighting each of the plurality of gate lines 22A. The addition readout also includes thinning out readout in which the pixel signal S included in the row in which the weight is set to zero is not read out (that is, thinned out) by setting the weight for at least one gate line 22A to zero.

The imaging sensor 20 may include an A/D converter in order to output a digitized imaging signal. The main controller 40 is an example of the "controller" according to the technique of the present disclosure. In addition to the main controller 40, the imaging sensor 20 may include a controller for controlling the vertical scanning circuit 22, the line memory 23, and the horizontal scanning circuit 24.

Figure 7:
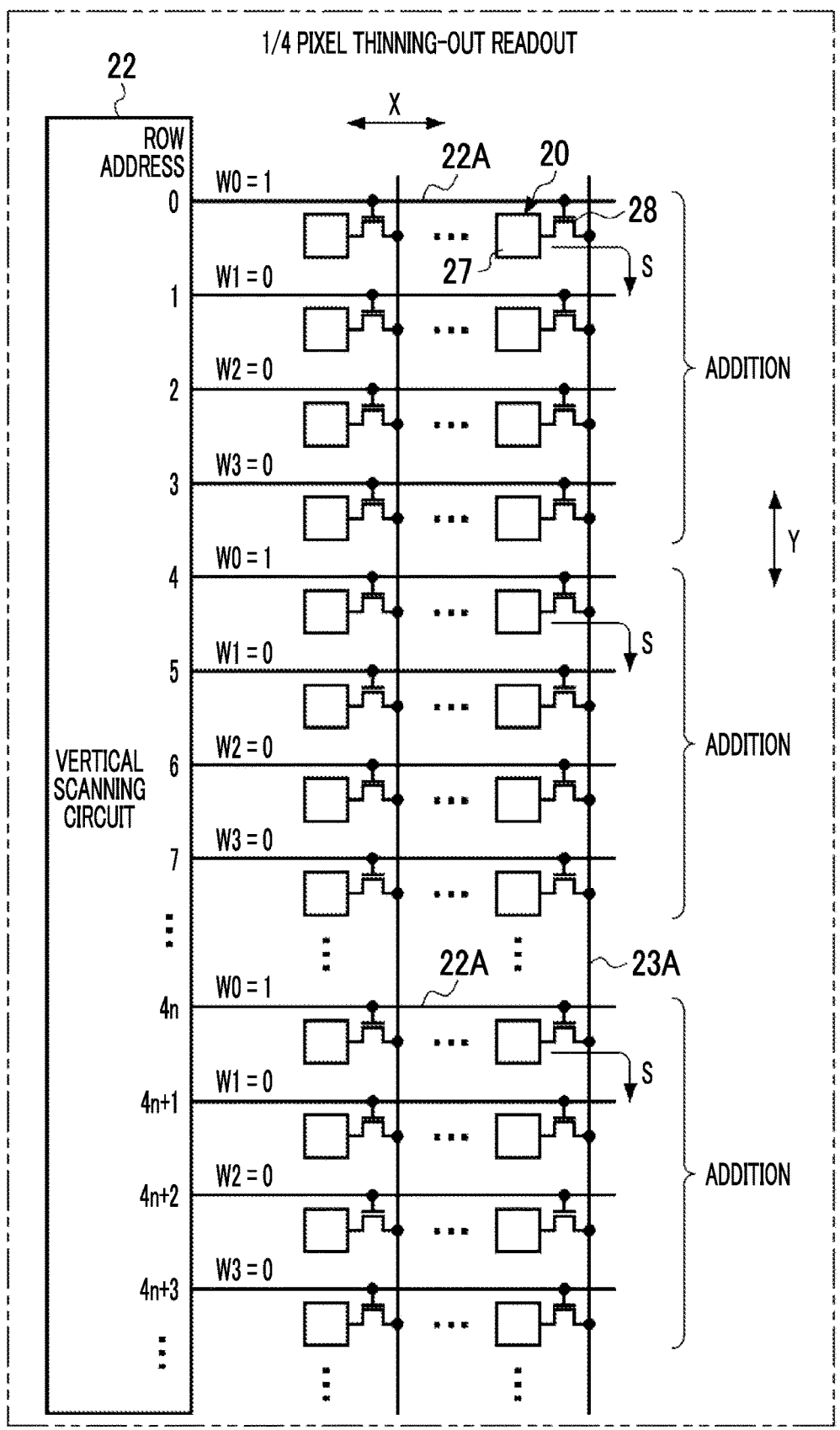
FIG. 7 is a diagram showing an example of addition readout.

FIG. 7 shows an example of addition readout. FIG. 7 shows an example in which the signal amount of the imaging signal is reduced to ¼ times by performing addition readout with weights for every four rows in the Y direction. In the present example, "¼ pixel thinning-out readout" for reading the pixel signal S from one row of the four rows will be described.

As shown in FIG. 7, the address of the gate line 22A (hereinafter referred to as a row address) is set to 0, 1, 2, 3, . . . in this order. In the present example, the main controller 40 sets a weight of "0" or "1" to each row address. It is assumed that W0 is a weight of the row having the row address 4n, W1 is a weight of the row having the row address 4n+1, W2 is a weight of the row having the row address 4n+2, and W3 is a weight of the row having the row address 4n+3. Here, n is a natural number which includes 0 (that is, n=0, 1, 2, 3, . . . ).

In the present example, the main controller 40 sets W0=1, W1=0, W2=0, and W3=0. Then, the vertical scanning circuit 22 performs addition readout with the row addresses 4n to 4n+3 as a group on the basis of the set weights W0 to W3. In a case of performing addition readout, the vertical scanning circuit 22 gives a selection signal to the row having a weight of "1" to turn on the transistor 28, and does not give the selection signal to the row having a weight of "0" to turn off the transistor 28. Thereby, the pixel signal S is read out only from the row having the row address 4n among the row addresses 4n to 4n+3. Therefore, in the present example, the pixel signal S is output to the signal line 23A every four rows in the order of row addresses 0, 4, 8, . . . .

By changing the weights W0 to W3, the main controller 40 makes it possible to execute one mode among the four types of addition readout modes. FIG. 8 shows the weights W0 to W3 respectively corresponding to a first addition readout mode M1, a second addition readout mode M2, a third addition readout mode M3, and a fourth addition readout mode M4. The first addition readout mode M1 corresponds to the readout method shown in FIG. 7, and the readout row address from which the pixel signal S is read out is "4n".

The second addition readout mode M2 is executed by setting the weight W1 to "1" and the other weights W0, W2, W3 to "0", and the readout row address is "4n+1". The third addition readout mode M3 is executed by setting the weight W2 to "1" and the other weights W0, W1 and W3 to "0", and the readout row address is "4n+2". The fourth addition readout mode M4 is executed by setting the weight W3 to "1" and the other weights W0, W1 and W2 to "0", and the readout row address is "4n+3".

Figure 9:
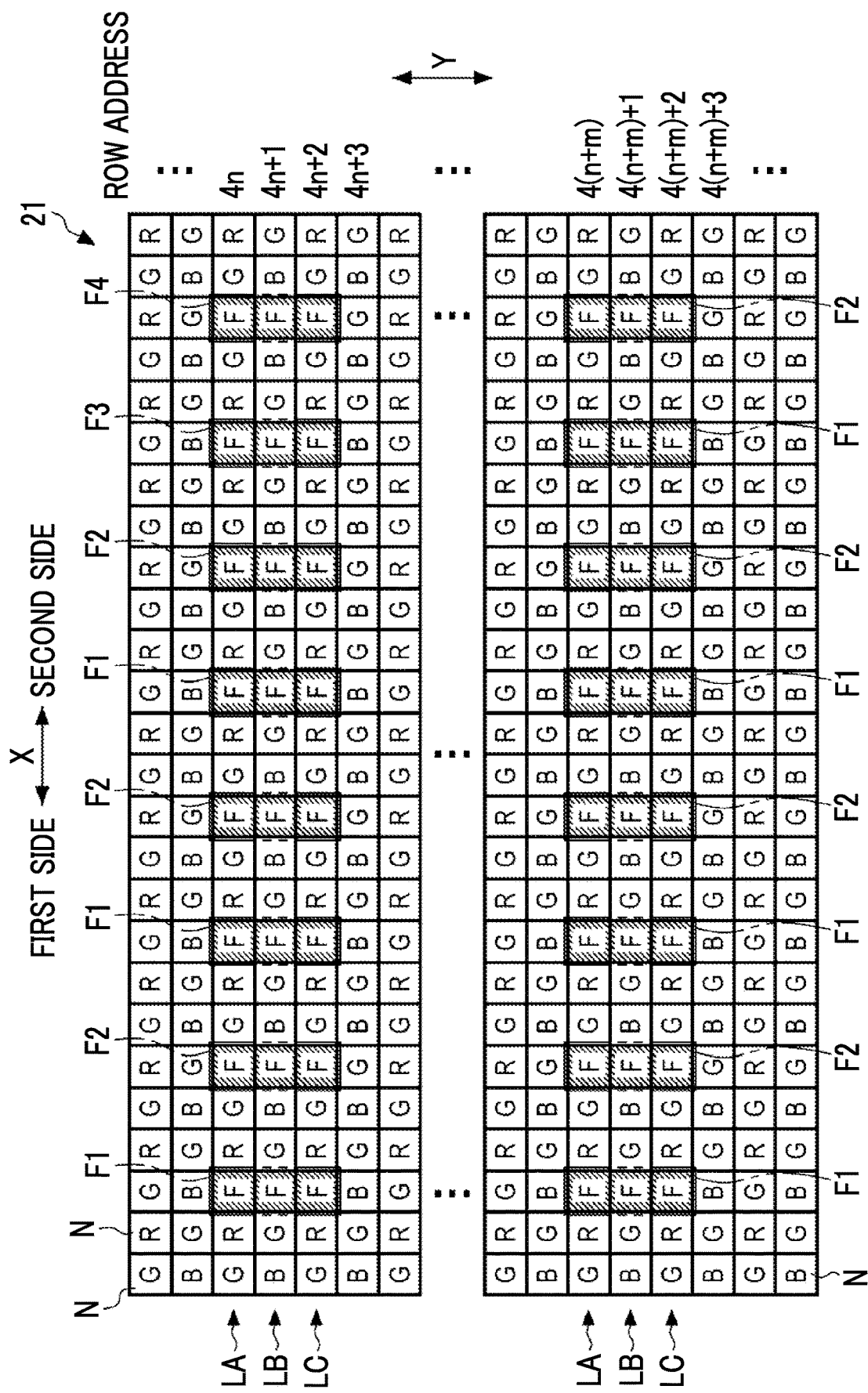
FIG. 9 is a diagram showing types of pixels which are included in a pixel region.

FIG. 9 shows types of pixels 26 (refer to FIG. 6) which are included in the pixel region 21. Reference numerals R, G, and B in FIG. 9 represent colors of the color filters provided in the pixels 26. The pixel 26 provided with these color filters is a pixel used for imaging for generating an image, and will be referred to as an imaging pixel N below.

The color array of the color filters shown in FIG. 9 is a so-called Bayer array. The Bayer array is a color array in which the G (green) color filter is disposed on the diagonal two pixels of the 2×2 four pixels and the R (red) and B (blue) color filters are disposed on the other two pixels. The color array of the color filter is not limited to the Bayer array, and may be another color array.

Further, the reference numeral F in FIG. 9 indicates a phase difference pixel. The phase difference pixel F is not provided with a color filter. As will be described in detail later, the phase difference pixel F receives one of the luminous fluxes divided in the X direction about the principal ray as a center.

The phase difference pixels F are disposed in the pixel region 21 by replacing a part of the imaging pixels N in the Bayer array. For example, the phase difference pixels F are arranged every three pixels (that is, every two pixels) in the X direction. Further, the plurality of phase difference pixels F are divided into a first phase difference pixel group F1 and a second phase difference pixel group F2. The first phase difference pixel group F1 is constituted of the phase difference pixels F each of which receives one of the luminous fluxes divided in the X direction about the principal ray as a center. The second phase difference pixel group F2 is constituted of the phase difference pixels F each of which receives the other of the luminous flux divided in the X direction about the principal ray as a center.

Further, the first phase difference pixel group F1 and the second phase difference pixel group F2 are divided into a plurality of types of phase difference pixels F having different light receiving characteristics in accordance with the optical characteristics of the imaging lens 12. In FIG. 9, there are provided the A pixel line LA in which the phase difference pixels F corresponding to the first optical characteristic are arranged, the B pixel line LB in which the phase difference pixels F corresponding to the second optical characteristic are arranged, and the C pixel line LC in which the phase difference pixels F corresponding to the third optical characteristic are arranged. In the present example, the A pixel line LA, the B pixel line LB, and the C pixel line LC are disposed adjacent to each other in the Y direction in this order.

For example, the A pixel line LA is disposed in the row of the row address 4n, the B pixel line LB is disposed in the row of the row address 4n+1, and the C pixel line LC is disposed in the row of the row address 4n+2. Further, in the present example, a plurality of the A pixel line LA, the B pixel line LB, and the C pixel line LC are provided. FIG. 9 shows two sets of the A pixel line LA, the B pixel line LB, and the C pixel line LC provided at positions separated by m rows in the Y direction.

The A pixel line LA, the B pixel line LB, and the C pixel line LC are selectively read out by the above-mentioned addition readout mode (refer to FIG. 9). Specifically, the A pixel line LA is read out by the first addition readout mode M1. The B pixel line LB is read out by the second addition readout mode M2. The C pixel line LC is read out by the third addition readout mode M3. That is, by selecting the addition readout mode, it is possible to read out a pixel line including the phase difference pixels F corresponding to the optical characteristics of the imaging lens 12.

Figure 10:
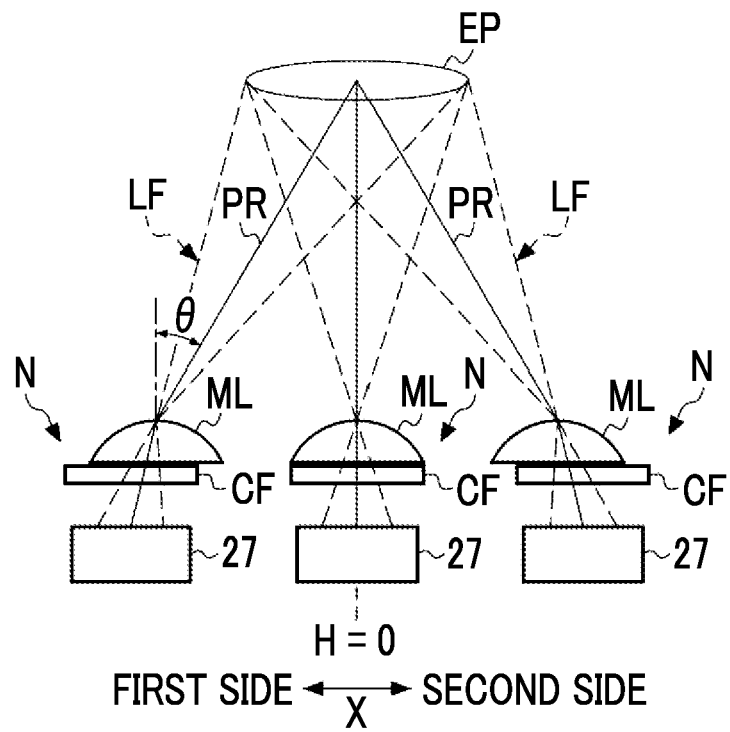
FIG. 10 is a diagram showing a configuration of imaging pixels.

FIG. 10 shows a configuration of the imaging pixel N. The imaging pixel N includes a photoelectric conversion element 27, a color filter CF, and a microlens ML. The color filter CF is disposed between the photoelectric conversion element 27 and the microlens ML. The color filter CF is a filter that transmits light of any of the colors R, G, and B.

The microlens ML collects the luminous flux incident from the exit pupil EP on the photoelectric conversion element 27 through the color filter CF. The microlens ML is disposed at a position more shifted from the center of the photoelectric conversion element 27 as the image height H is larger. Specifically, the microlens ML, which is located on one side (hereinafter referred to as the first side) in the X direction with respect to the position of H=0 as a reference, is located at a position shifted from the center of the photoelectric conversion element 27 to the other side (hereinafter referred to as the second side) in the X direction. On the contrary, the microlens ML, which is located on the second side in the X direction with respect to the position of H=0 as a reference, is disposed at a position shifted from the center of the photoelectric conversion element 27 to the first side.

The principal ray angle θ, which is an incidence angle of the principal ray PR of the luminous flux incident from the exit pupil EP, increases as the image height H increases. Therefore, the principal ray PR can be incident on approximately the center of the photoelectric conversion element 27 by shifting the microlens ML as described above. Similarly, in the Y direction, the microlens ML is disposed at a position more shifted from the center of the photoelectric conversion element 27 as the image height H is larger. By shifting the microlens ML in such a manner, it is possible to improve a decrease in light amount received in the peripheral region of the pixel region 21 (refer to FIG. 6).

Figure 11:
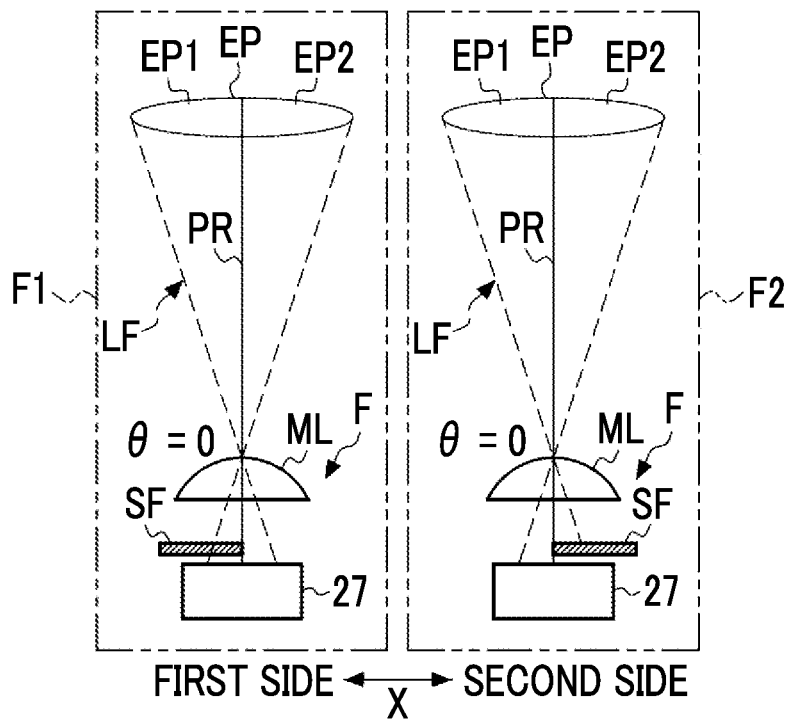
FIG. 11 is a diagram showing a configuration of phase difference pixels.

FIG. 11 shows configurations of the phase difference pixels F. Specifically, FIG. 11 shows the configurations of the phase difference pixels F which are included in the first phase difference pixel group F1 and the second phase difference pixel group F2 in the central region located in the center with respect to the X direction of the pixel region 21.

The phase difference pixel F includes the photoelectric conversion element 27, a light blocking layer SF, and the microlens ML. The microlens ML is disposed at the same position as the imaging pixel N. That is, the microlens ML is disposed at a position more shifted from the center of the photoelectric conversion element 27 as the image height H is larger. The phase difference pixel F shown in FIG. 11 is located in the central region of the pixel region 21 (that is, the image height H is substantially 0). Therefore, the amount of shift of the microlens ML with respect to the center of the photoelectric conversion element 27 is substantially 0.

The light blocking layer SF is formed of a metal film or the like, and is disposed between the photoelectric conversion element 27 and the microlens ML. The light blocking layer SF blocks a part of the luminous flux LF incident on the photoelectric conversion element 27 through the microlens ML.

The principal ray angle θ is substantially 0 in the central portion of the pixel region 21. Therefore, the phase difference pixels F which are included in the first phase difference pixel group F1 and the phase difference pixels F which are included in the second phase difference pixel group F2 have structures symmetrical with respect to the X direction.

In the phase difference pixels F which are included in the first phase difference pixel group F1, the light blocking layer SF blocks the first side from the center of the photoelectric conversion element 27 as a reference. That is, in the phase difference pixels F which are included in the first phase difference pixel group F1, the light blocking layer SF causes the luminous flux from the first side exit pupil EP1 to be incident on the photoelectric conversion element 27, and blocks the luminous flux from the second side exit pupil EP2.

In the phase difference pixels F which are included in the second phase difference pixel group F2, the light blocking layer SF blocks the second side from the center of the photoelectric conversion element 27 as a reference. That is, in the phase difference pixels F which are included in the second phase difference pixel group F2, the light blocking layer SF causes the luminous flux from the second side exit pupil EP2 to be incident on the photoelectric conversion element 27, and blocks the luminous flux from the first side exit pupil EP1.

Figure 12:
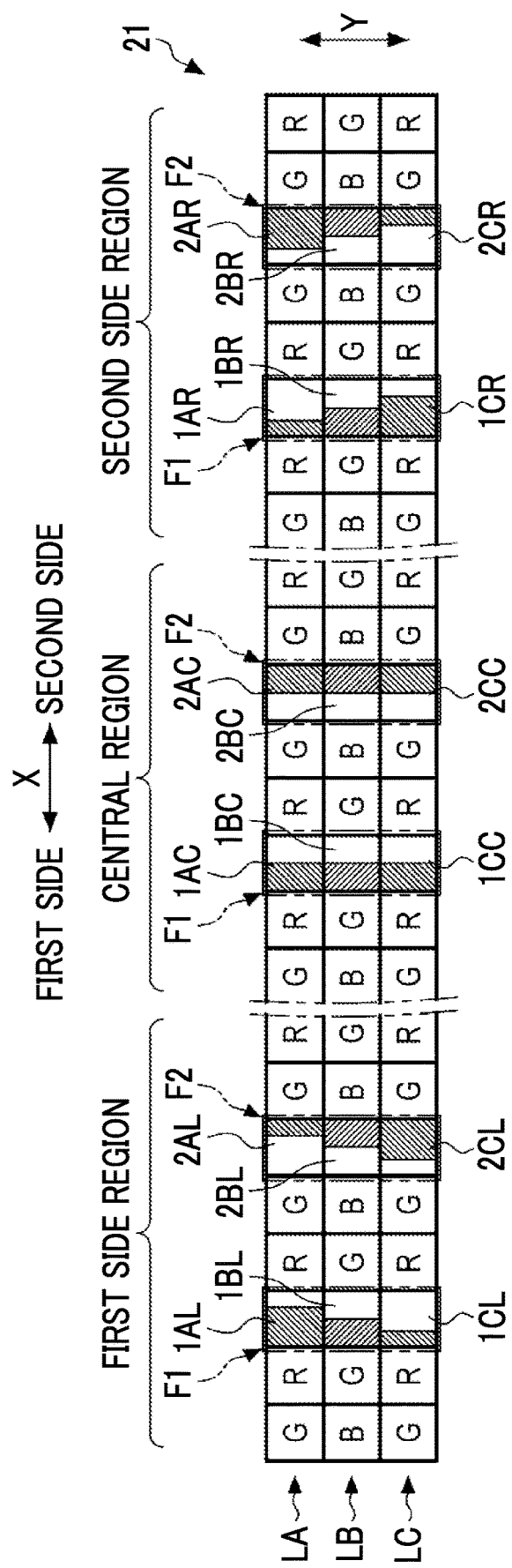
FIG. 12 is a diagram showing types of phase difference pixels which are included in each region of the pixel region.

FIG. 12 shows the types of phase difference pixels F which are included in each region of the pixel region 21. First, in the central region located in the center of the pixel region 21 in the X direction, the first phase difference pixel group F1 includes the first A pixel 1AC, the first B pixel 1BC, and the first C pixel 1CC, and the second phase difference pixel group F2 includes a second A pixel 2AC, a second B pixel 2BC, and a second C pixel 2CC. The first A pixel 1AC and the second A pixel 2AC are disposed on the A pixel line LA. The first B pixel 1BC and the second B pixel 2BC are disposed on the B pixel line LB. The first C pixel 1CC and the second C pixel 2CC are disposed on the C pixel line LC.

In the first side region located on the first side in the X direction of the pixel region 21, the first phase difference pixel group F1 includes the first A pixel 1AL, the first B pixel 1BL, and the first C pixel 1CL, and the second phase difference pixel group F2 includes a second A pixel 2AL, a second B pixel 2BL, and a second C pixel 2CL. The first A pixel 1AL and the second A pixel 2AL are disposed on the A pixel line LA. The first B pixel 1BL and the second B pixel 2BL are disposed on the B pixel line LB. The first C pixel 1CL and the second C pixel 2CL are disposed on the C pixel line LC.

In the second side region located on the second side in the X direction of the pixel region 21, the first phase difference pixel group F1 includes the first A pixel 1AR, the first B pixel 1BR, and the first C pixel 1CR, and the second phase difference pixel group F2 includes a second A pixel 2AR, a second B pixel 2BR, and a second C pixel 2CR. The first A pixel 1AR and the second A pixel 2AR are disposed on the A pixel line LA. The first B pixel 1BR and the second B pixel 2BR are disposed on the B pixel line LB. The first C pixel 1CR and the second C pixel 2CR are disposed on the C pixel line LC.

For example, the first side region and the second side region are peripheral regions located around the pixel region 21. The first side region and the second side region are provided at positions symmetrical with respect to the central region in the X direction. For example, the first side region and the second side region are provided at positions where the image height H is, for example, "1".

Figure 13:
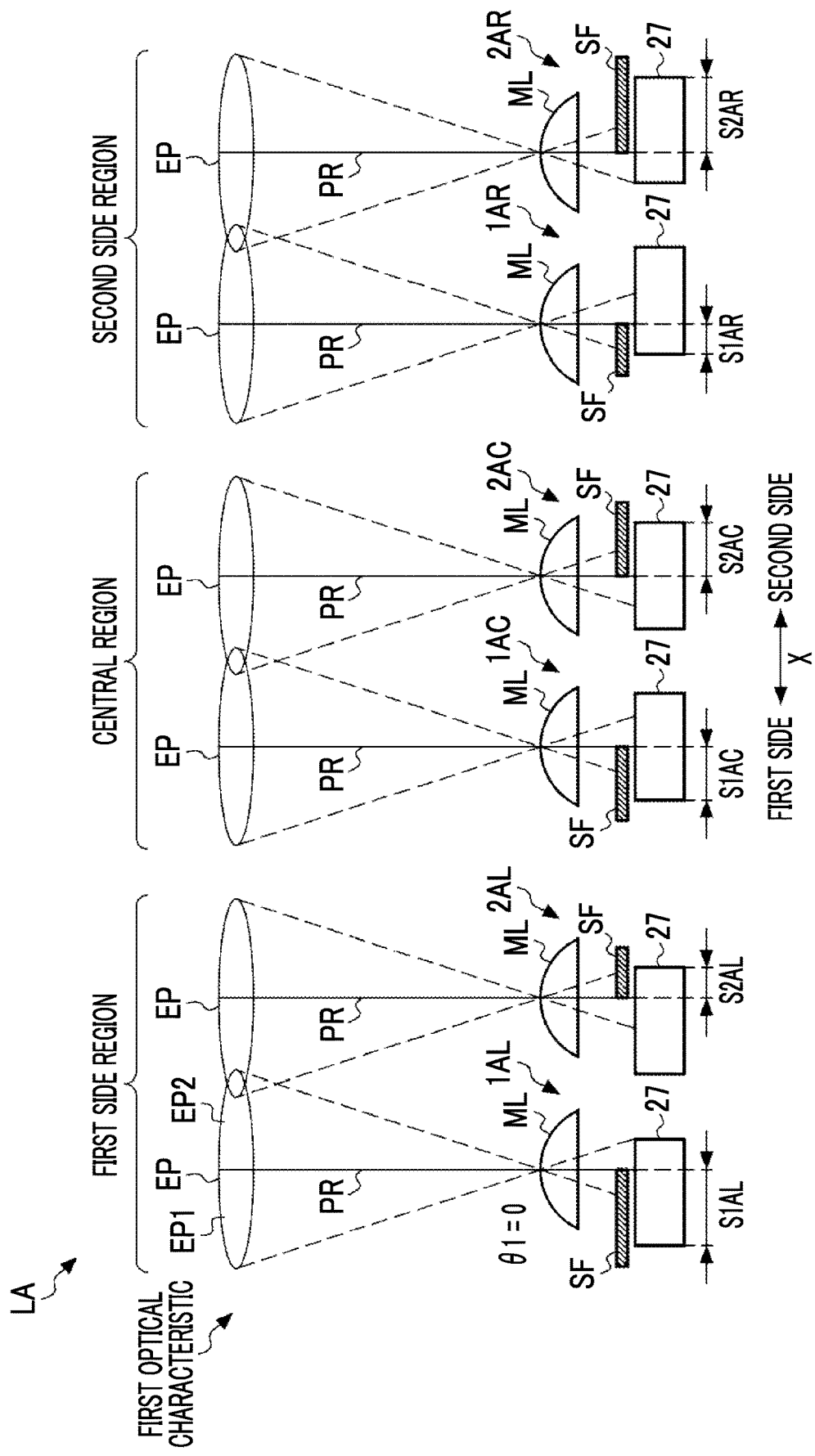
FIG. 13 is a diagram showing a configuration of phase difference pixels which are included in the A pixel line.

FIG. 13 shows a configuration of the phase difference pixels F which are included in the A pixel line LA. In the following description, the area where the photoelectric conversion element 27 is blocked by the light blocking layer SF is referred to as a light blocking area.

The A pixel line LA includes phase difference pixels F corresponding to the first optical characteristic. The first optical characteristic has a feature that the principal ray angle (hereinafter, referred to as peripheral principal ray angle) in the peripheral region of the pixel region 21 is 0. That is, in the first optical characteristic, the principal ray angle θ does not depend on the image height H, and all the principal rays PR are parallel to the optical axis OP. The peripheral principal ray angle is the principal ray angle in the first side region and the second side region, and is, for example, the principal ray angle corresponding to H=1. Hereinafter, the peripheral principal ray angle of the first optical characteristic is referred to as the first peripheral principal ray angle θ1.

The first A pixel 1AC and the second A pixel 2AC which are included in the central region have the same configurations as the pair of phase difference pixels F shown in FIG. 11. The first A pixel 1AC and the second A pixel 2AC have structures symmetrical with respect to the X direction.

Therefore, the light blocking area S1AC of the first A pixel 1AC is equal to the light blocking area S2AC of the second A pixel 2AC.

In the first A pixel 1AL and the second A pixel 2AL which are included in the first side region, in the same manner as the above-mentioned imaging pixel N, the microlens ML is disposed in a position which is shifted from the center of the photoelectric conversion element 27 toward the central region (second side). θ1=0 in the first optical characteristic. Therefore, the principal ray PR is incident at a position shifted from the center of the photoelectric conversion element 27 by a distance corresponding to the amount of shift of the microlens ML.

In the first A pixel 1AL, the light blocking layer SF is disposed on the first side from the incident position of the principal ray PR of the photoelectric conversion element 27 so as to block the luminous flux from the exit pupil EP2. In the second A pixel 2AL, the light blocking layer SF is disposed on the second side from the incident position of the principal ray PR of the photoelectric conversion element 27 so as to block the luminous flux from the exit pupil EP1.

Therefore, the light blocking area S1AL of the first A pixel 1AL is larger than the light blocking area S1AC of the first A pixel 1AC which is included in the central region. On the other hand, the light blocking area S2AL of the second A pixel 2AL is smaller than the light blocking area S2AC of the second A pixel 2AC which is included in the central region.

The first A pixel 1AR which is included in the second side region has a structure symmetrical with respect to the second A pixel 2AL which is included in the first side region in the X direction. The second A pixel 2AR which is included in the second side region has a structure symmetrical with respect to the first A pixel 1AL which is included in the first side region in the X direction. Therefore, the light blocking area S1AR of the first A pixel 1AR is smaller than the light blocking area S1AC of the first A pixel 1AC which is included in the central region. On the other hand, the light blocking area S2AR of the second A pixel 2AR is larger than the light blocking area S2AC of the second A pixel 2AC which is included in the central region.

Figure 14:
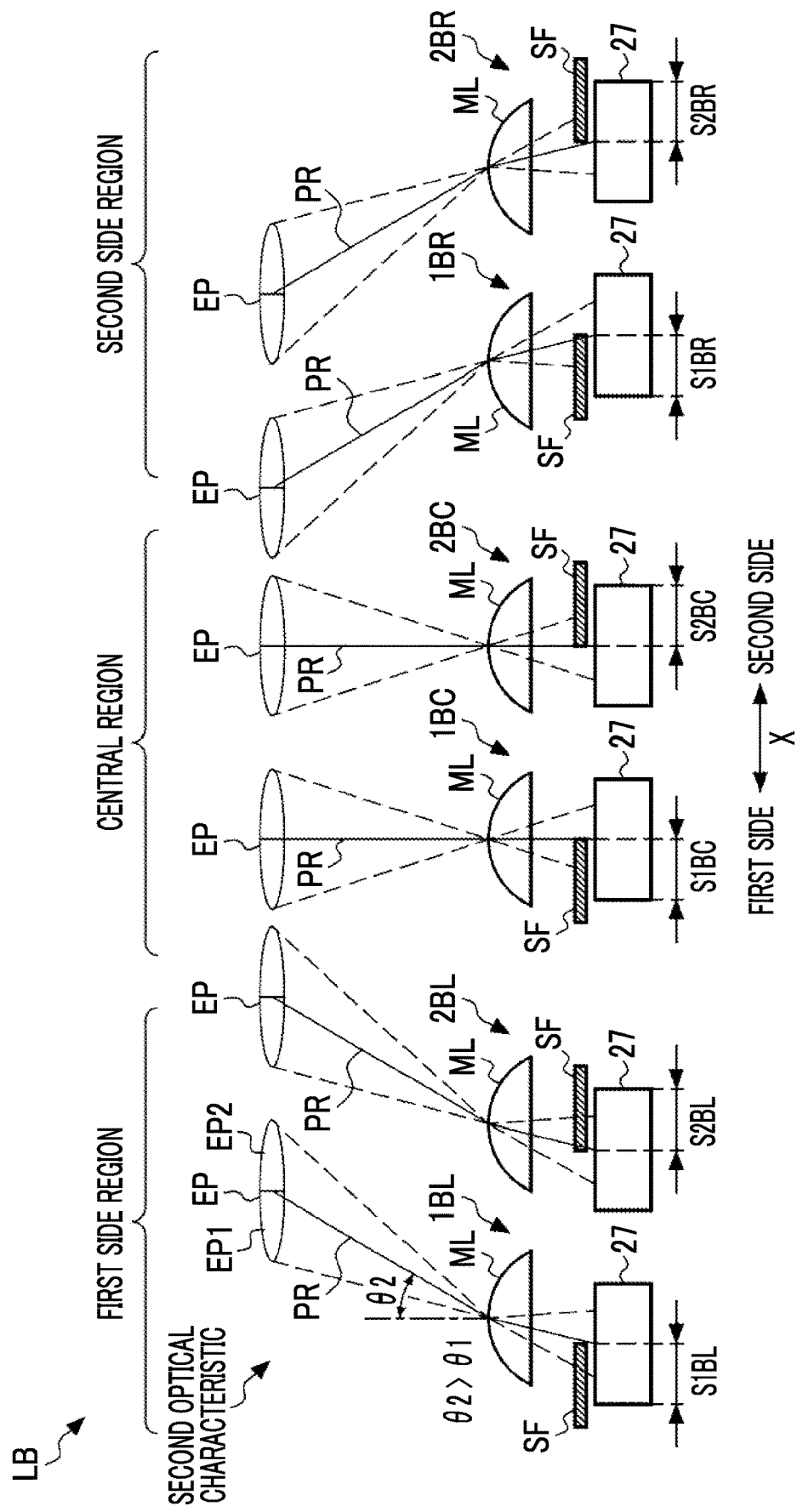
FIG. 14 is a diagram showing a configuration of phase difference pixels which are included in the B pixel line.

FIG. 14 shows a configuration of the phase difference pixels F which are included in the B pixel line LB. The B pixel line LB includes phase difference pixels F corresponding to the second optical characteristic. The second optical characteristic has a feature that the peripheral principal ray angle is larger than 0. Hereinafter, the peripheral principal ray angle of the second optical characteristic is referred to as a second peripheral principal ray angle θ2.

The first B pixel 1BC and the second B pixel 2BC which are included in the central region have the same configurations as the first A pixel 1AC and the second A pixel 2AC which are included in the central region of the A pixel line LA. The first B pixel 1BC and the second B pixel 2BC have structures symmetrical with respect to the X direction. Therefore, the light blocking area S1BC of the first B pixel 1BC is equal to the light blocking area S2BC of the second B pixel 2BC.

In the first B pixel 1BL and the second B pixel 2BL which are included in the first side region, the microlens ML is disposed at a position shifted from the center of the photoelectric conversion element 27 toward the central region (second side). In the second optical characteristic, in the first side region, the principal ray PR is incident on substantially the center of the photoelectric conversion element 27.

In the first B pixel 1BL, the light blocking layer SF is disposed on the first side from the incident position of the principal ray PR of the photoelectric conversion element 27 so as to block the luminous flux from the exit pupil EP2. In the second B pixel 2BL, the light blocking layer SF is disposed on the second side from the incident position of the principal ray PR of the photoelectric conversion element 27 so as to block the luminous flux from the exit pupil EP1.

Therefore, the light blocking area S1BL of the first B pixel 1BL is equal to the light blocking area S1BC of the first B pixel 1BC which is included in the central region. Further, the light blocking area S2BL of the second B pixel 2BL is equal to the light blocking area S2BC of the second B pixel 2BC which is included in the central region.

The first B pixel 1BR which is included in the second side region has a structure symmetrical with respect to the second B pixel 2BL which is included in the first side region in the X direction. The second B pixel 2BR which is included in the second side region has a structure symmetrical with respect to the first B pixel 1BL which is included in the first side region in the X direction. Therefore, the light blocking area S1BR of the first B pixel 1BR is equal to the light blocking area S1BC of the first B pixel 1BC which is included in the central region. Further, the light blocking area S2BR of the second B pixel 2BR is equal to the light blocking area S2BC of the second B pixel 2BC which is included in the central region.

Figure 15:
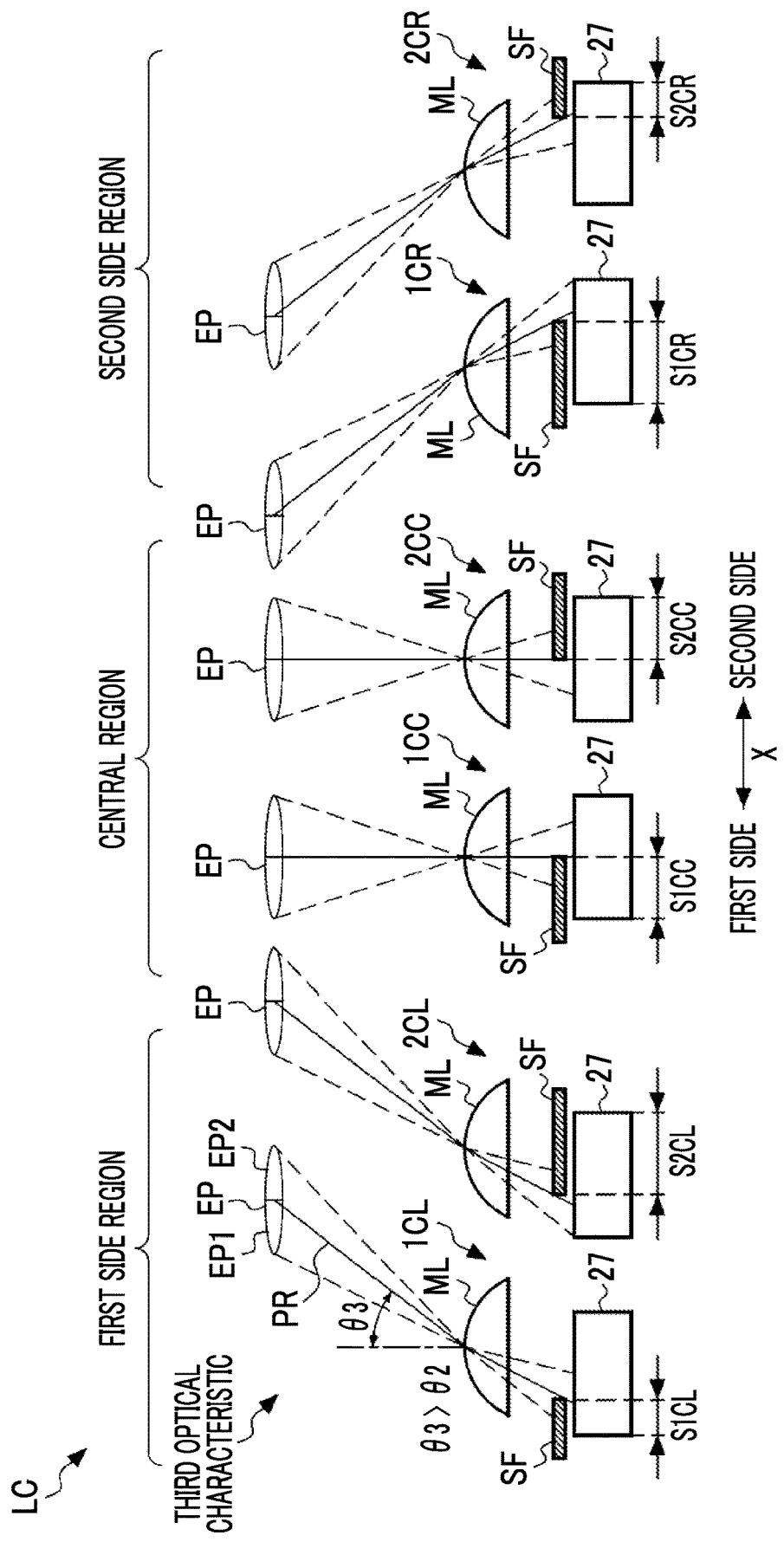
FIG. 15 is a diagram showing a configuration of phase difference pixels which are included in the C pixel line.

FIG. 15 shows a configuration of the phase difference pixels F which are included in the C pixel line LC. The C pixel line LC includes phase difference pixels F corresponding to the third optical characteristic. The third optical characteristic has a feature that the peripheral principal ray angle is larger than that of the second optical characteristic. Hereinafter, the peripheral principal ray angle of the third optical characteristic is referred to as a third peripheral principal ray angle θ3.

The first C pixel 1CC and the second C pixel 2CC which are included in the central region have the same configurations as the first B pixel 1BC and the second B pixel 2BC which are included in the central region of the B pixel line LB. The first C pixel 1CC and the second C pixel 2CC have structures symmetrical with respect to the X direction. Therefore, the light blocking area S1CC of the first C pixel 1CC is equal to the light blocking area S2CC of the second C pixel 2CC.

In the first C pixel 1CL and the second C pixel 2CL which are included in the first side region, the microlens ML is disposed at a position shifted from the center of the photoelectric conversion element 27 toward the central region (second side). In the third optical characteristic, θ3>θ2. Therefore, the principal ray PR is incident on the first side of the center of the photoelectric conversion element 27 in the first side region.

In the first C pixel 1CL, the light blocking layer SF is disposed on the first side from the incident position of the principal ray PR of the photoelectric conversion element 27 so as to block the luminous flux from the exit pupil EP2. In the second C pixel 2CL, the light blocking layer SF is disposed on the second side from the incident position of the principal ray PR of the photoelectric conversion element 27 so as to block the luminous flux from the exit pupil EP1.

Therefore, the light blocking area S1CL of the first C pixel 1CL is smaller than the light blocking area S1CC of the first C pixel 1CC which is included in the central region. On the other hand, the light blocking area S2CL of the second C pixel 2CL is larger than the light blocking area S2CC of the second C pixel 2CC which is included in the central region.

The first C pixel 1CR which is included in the second side region has a structure symmetrical with respect to the second C pixel 2CL which is included in the first side region in the X direction. The second C pixel 2CR which is included in the second side region has a structure symmetrical with respect to the first C pixel 1CL which is included in the first side region in the X direction. Therefore, the light blocking area S1CR of the first C pixel 1CR is larger than the light blocking area S1CC of the first C pixel 1CC which is included in the central region. Further, the light blocking area S2CR of the second C pixel 2CR is smaller than the light blocking area S2CC of the second C pixel 2CC which is included in the central region.

From the above relationship, in a case where the light blocking areas are compared, a relationship of "S1AL>S1AC>S1AR" and "S2AL<S2AC<S2AR" can be obtained for the A pixel line LA. For the B pixel line LB, a relationship of "S1BL=S1BC=S1BR" and "S2BL=S2BC=S2BR" can be obtained. Regarding the C pixel line LC, a relationship of "S1CL<S1CC<S1CR" and "S2CL>S2CC>S2CR" can be obtained.

Further, for the first side region, a relationship of "S1AL>S1BL>S1CL" and "S2AL<S2BL<S2CL" can be obtained. For the central region, a relationship of "S1AC=S1BC=S1CC" and "S2AC=S2BC=S2CC" can be obtained. For the second side region, a relationship of "S1AR<S1BR<S1CR" and "S2AR>S2BR>S2CR" can be obtained.

Figure 16:
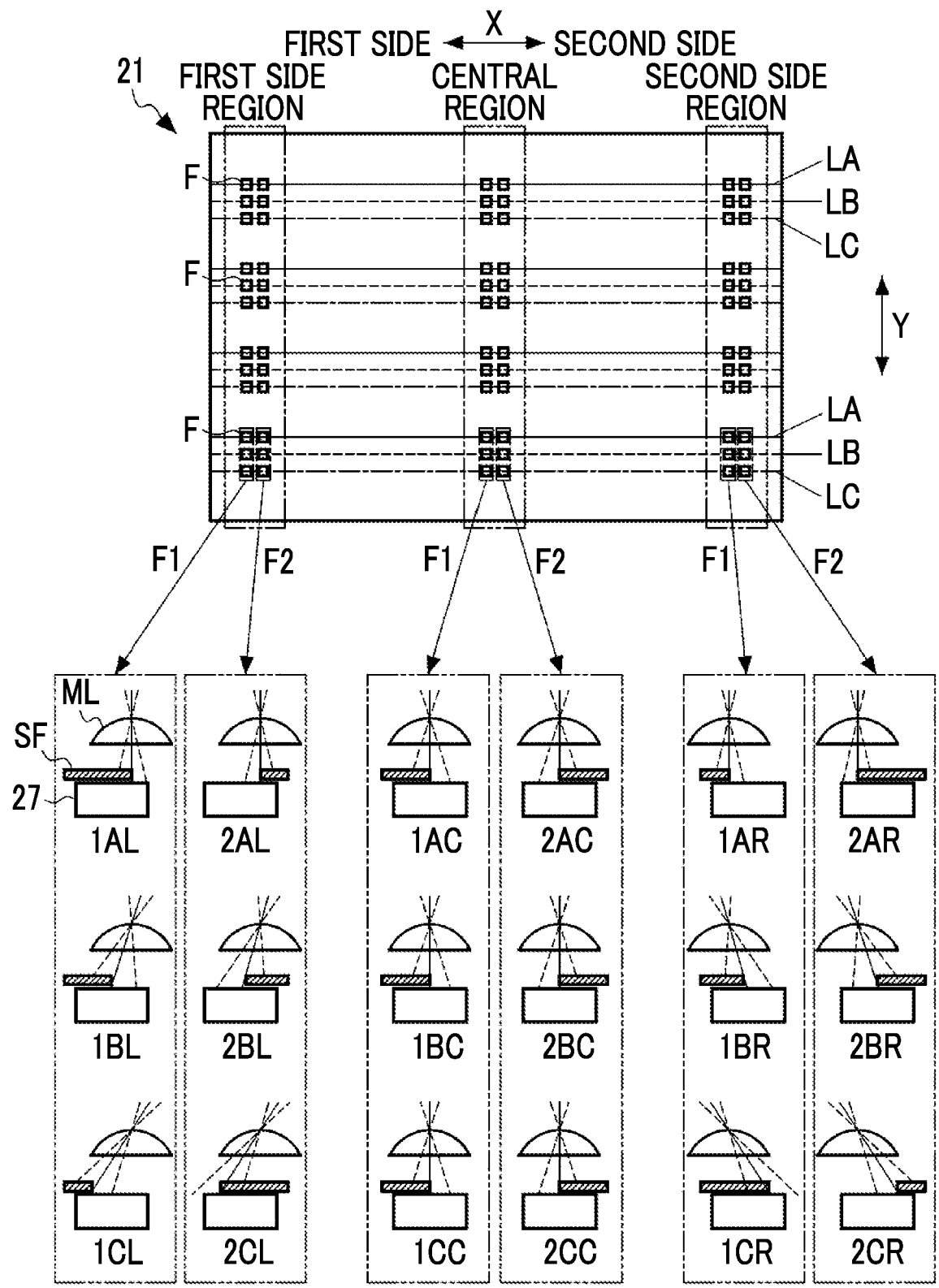
FIG. 16 is a diagram showing an overall configuration of phase difference pixels which are included in the pixel region.

FIG. 16 shows an overall configuration of the phase difference pixels F which are included in the pixel region 21. As shown in FIG. 16, in the pixel region 21, a plurality of sets of A pixel line LA, B pixel line LB, and C pixel line LC are provided in the Y direction. The pixel region 21 may be provided with at least one set of the A pixel line LA, the B pixel line LB, or the C pixel line LC.

Further, in the above description, the configuration of the phase difference pixels F provided in the central region, the first side region, and the second side region have been given. However, the same phase difference pixels F are provided along each pixel line between the central region and the first side region and between the central region and the second side region. The light blocking layer SF is formed in the phase difference pixels F so as to receive the luminous flux from the exit pupil EP1 or the exit pupil EP2 in accordance with the optical characteristics corresponding to the pixel lines.

The light blocking area of the plurality of first A pixels arranged on the A pixel line LA is smaller at a position closer to the second side from the first side. The light blocking areas of the plurality of first A pixels arranged on the A pixel line LA do not have to be all different, and the first A pixels having the same light blocking area may be partially arranged.

The light blocking area of the plurality of second A pixels arranged on the A pixel line LA is larger at a position closer to the second side than the first side. The light blocking areas of the plurality of second A pixels arranged on the A pixel line LA do not have to be all different, and the second A pixels having the same light blocking area may be partially arranged.

The light blocking areas of the plurality of first B pixels arranged on the B pixel line LB are all equal. Similarly, the light blocking areas of the plurality of second B pixels arranged on the B pixel line LB are all equal.

The light blocking area of the plurality of first C pixels arranged on the C pixel line LC is larger at a position closer to the second side than the first side. The light blocking areas of the plurality of first C pixels arranged on the C pixel line LC do not have to be different, and the first C pixels having the same light blocking area may be partially arranged.

The light blocking area of the plurality of second C pixels arranged on the C pixel line LC is smaller at a position closer to the second side from the first side. The light blocking areas of the plurality of second C pixels arranged on the C pixel line LC do not have to be all different, and the second C pixels having the same light blocking area may be partially arranged.

Figure 17:
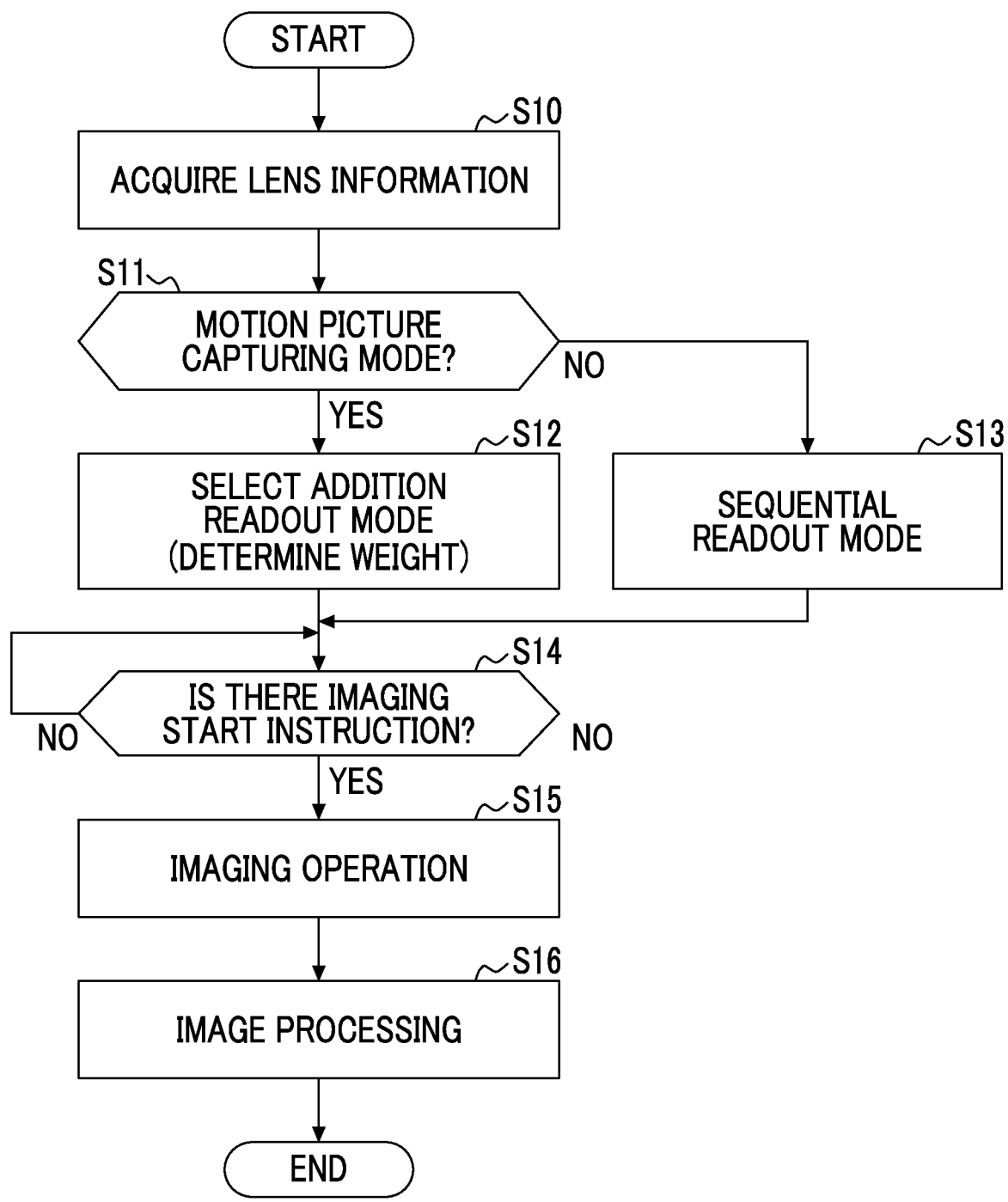
FIG. 17 is a flowchart showing a procedure of processing executed by the main controller.

Next, an operation of the imaging apparatus 10 will be described. FIG. 17 is a flowchart showing an example of the flow of processing executed by the main controller 40.

First, in step S10, the main controller 40 acquires lens information 35A (refer to FIG. 4) from the imaging lens 12 attached to the body 11. For example, the main controller 40 acquires lens information 35A in a case where the power switch is turned on while the imaging lens 12 is attached to the body 11. The lens information 35A includes principal ray angle information as optical characteristics of the imaging lens 12.

In step S11, in a case where the operation mode is selected by the dial 13, the main controller 40 determines whether or not the selected operation mode is the motion picture capturing mode. In a case where the selected operation mode is the motion picture capturing mode (step S11: YES), the main controller 40 advances the processing to step S12. In a case where the selected operation mode is not the motion picture capturing mode, that is, the still image capturing mode (step S11: NO), the main controller 40 advances the processing to step S13.

In step S12, the main controller 40 selects the addition readout mode (refer to FIG. 8) on the basis of the lens information 35A acquired in step S10. The selection of the addition readout mode corresponds to the determination of the weights W1 to W3 for the plurality of pixel signals S for the addition readout.

Specifically, as shown in FIG. 18, the main controller 40 acquires the peripheral principal ray angle θp (for example, the principal ray angle θ corresponding to H=1) by referring to the lens information 35A. The main controller 40 selects the addition readout mode corresponding to the pixel line corresponding to the peripheral principal ray angle closest to the peripheral principal ray angle θp acquired from the lens information 35A among the first peripheral principal ray angle θ1, the second peripheral principal ray angle θ2, and the third peripheral principal ray angle θ3. For example, the main controller 40 selects the second addition readout mode M2 corresponding to the B pixel line LB in a case where the peripheral principal ray angle θp included in the lens information 35A is closest to the second peripheral principal ray angle θ2. The selection of the second addition readout mode M2 is performed by setting W1=1, W0=W2=W3=0.

In a case where the autofocus mode is selected by the instruction key 16, the main controller 40 selects any one of the first addition readout mode M1, the second addition readout mode M2, and the third addition readout mode M3. On the other hand, in a case where the manual focus mode is selected by the instruction key 16, the main controller 40 selects the fourth addition readout mode M4.

Returning to FIG. 17, in step S13, the main controller 40 selects a sequential readout mode in which the pixel signal S is read out by a sequential readout method.

In the next step S14, the main controller 40 determines whether or not the imaging start instruction has been given by operating the release button 14. In a case where the imaging start instruction is given (step S14: YES), the main controller 40 advances the processing to step S15.

In step S15, the main controller 40 causes the imaging sensor 20 to perform an imaging operation on the basis of the mode selected in step S12 or step S13. In a case where the motion picture capturing mode is selected, the main controller 40 controls readout of the pixel signal S from the pixel region 21 on the basis of the addition readout mode selected in step S12. As a result, the pixel signal S is sequentially read out from the pixel region 21 from the row in which the weight is set to "1", that is, the row corresponding to the pixel line selected in step S12.

For example, in a case where the second addition readout mode M2 corresponding to the B pixel line LB is selected in step S12, the pixel signal S is selectively read out from the row of the row address 4n+1 including the B pixel line LB. The pixel signal S which is read out from the imaging pixel N and the pixel signal S which is read out from the phase difference pixel F are input to the image processing unit 41 as an imaging signal.

In a case where the fourth addition readout mode M4 is selected in step S12, the pixel signal S is read out from the row at the row address 4n+3 that does not include the phase difference pixel F. Therefore, only the pixel signal S which is read out from the imaging pixel N is input to the image processing unit 41.

In step S16, the image processing unit 41 performs image processing. The image processing unit 41 generates image data representing a subject image by performing demosaic processing or the like on the basis of the pixel signal S which is read out from the imaging pixel N. The image processing unit 41 is unable to obtain a pixel signal for imaging from the phase difference pixel F. Therefore, the image processing unit 41 calculates pixel values corresponding to the positions of the phase difference pixels F in the image data by performing complementary processing on the basis of the pixel values in the vicinity thereof.

Further, in step S16, the main controller 40 performs focusing control by the phase difference method on the basis of the pixel signal S which is read out from the phase difference pixel F. Specifically, the main controller 40 adjusts the position of the focus lens 31 so as to reduce the phase differences between images of the pixel signals S obtained from the phase difference pixels F which are included in the first phase difference pixel group F1 and the pixel signals S obtained from the phase difference pixels F which are included in the second phase difference pixel group F2. For example, in a case where the B pixel line LB is selected, focusing control is performed on the basis of the phase differences between the pixel signals S of the first B pixel 1BL, the first B pixel 1BC, and the first B pixel 1BR and the pixel signals S of the second B pixel 2BL, the second B pixel 2BC, and the second B pixel 2BR.

In the motion picture capturing mode, the main controller 40 repeatedly performs the processing of steps S15 and S16, and ends the imaging operation in a case where the imaging end instruction is given. Thereby, the image processing unit 41 generates motion picture data in which the signal amount of the imaging signal is reduced by ¼ times.

Further, in step S15, in a case where the still image capturing mode is selected, the readout of the pixel signal S from the pixel region 21 is controlled on the basis of the sequential readout mode. As a result, the pixel signal S is read out from all the pixels in the pixel region 21 and input to the image processing unit 41. In such a case, in step S16, the image processing unit 41 generates still image data. In the still image capturing mode, the live view image display and focusing control may be performed by reading out the pixel signal S in the addition readout mode similar to the motion picture capturing mode during the preparatory operation performed in accordance with the half-pressing of the release button 14.

As described above, according to the imaging apparatus 10 of the first embodiment, focusing control can be performed by using pixel signals of appropriate phase difference pixels according to the optical characteristics of the imaging lens.

Second Embodiment

Next, a second embodiment of the present disclosure will be described. In the second embodiment, the main controller 40 makes it possible to perform readout in the fifth addition readout mode M5 and the sixth addition readout mode M6 in addition to the addition readout mode described in the first embodiment. Other configurations of the imaging apparatus of the second embodiment are the same as the configurations of the imaging apparatus 10 of the first embodiment.

Figure 19:
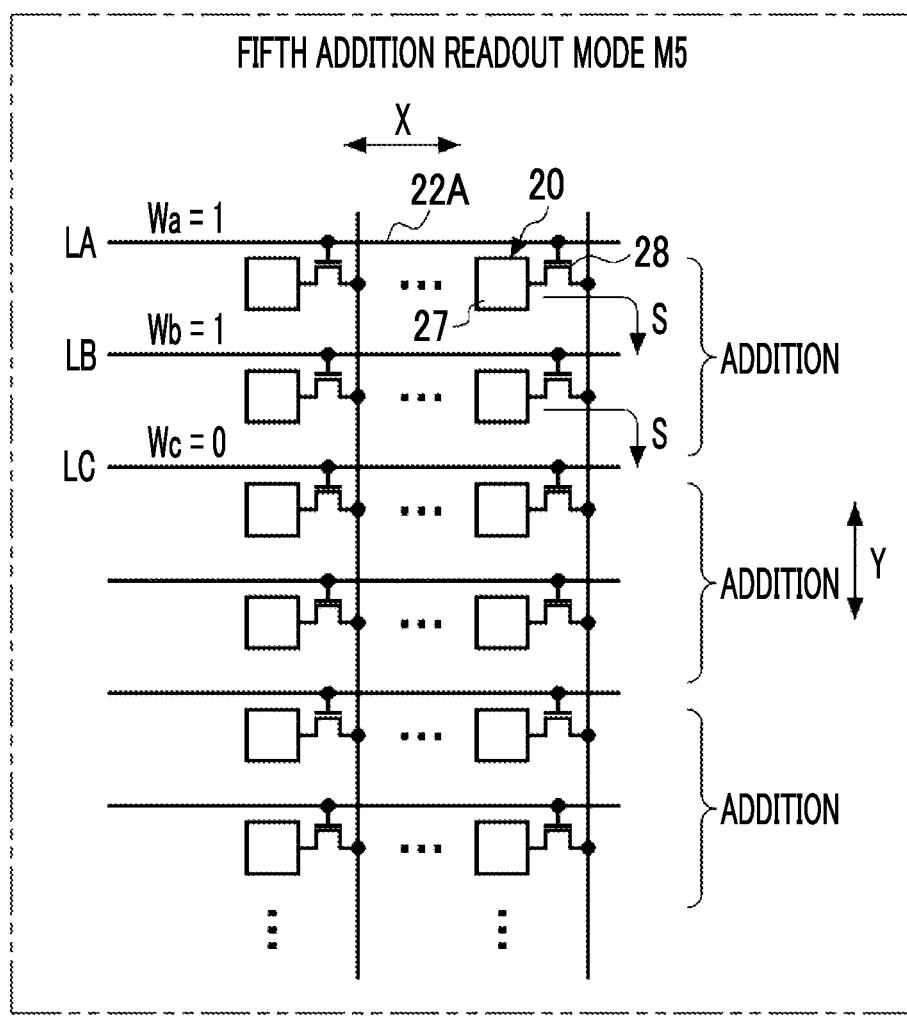
FIG. 19 is a diagram showing a fifth addition readout mode.

FIG. 19 is a diagram showing a fifth addition readout mode M5. The fifth addition readout mode M5 is a so-called two-pixel addition readout method in which the gate lines 22A are set by two rows and two pixel signals S are added and read out in order. The main controller 40 makes it possible to set weights for the A pixel line LA, the B pixel line LB, and the C pixel line LC. The main controller 40 performs addition readout on the basis of the weight, as in the first embodiment.

The weight for the A pixel line LA is Wa, the weight for the B pixel line LB is Wb, and the weight for the C pixel line LC is Wc. In the fifth addition readout mode M5, the main controller 40 performs addition readout with the A pixel line LA and the B pixel line LB as a set in a case where Wa=1, Wb=1, and Wc=0. In such a case, the pixel signal S from the A pixel line LA and the pixel signal S from the B pixel line LB are added and averaged at a ratio of 1:1.

The main controller 40 selects the fifth addition readout mode M5 in a case where the value of the peripheral principal ray angle θp included in the lens information 35A is between the first peripheral principal ray angle θ1 and the second peripheral principal ray angle θ2. In the fifth addition readout mode M5, for example, by adding the pixel signal S of the first A pixel 1AL and the pixel signal S of the first B pixel 1BL, it is possible to obtain the pixel signal corresponding to the fourth peripheral principal ray angle θ4 represented by Expression (1).

$$θ4=(θ1+θ2)/2 \quad (1)$$

As described above, by using the fifth addition readout mode M5, it is possible to appropriately perform focusing control even in a case where the imaging lens 12 having the peripheral principal ray angle θp between the first peripheral principal ray angle θ1 and the second peripheral principal ray angle θ2 is attached to the body 11.

Figures 20, 21:
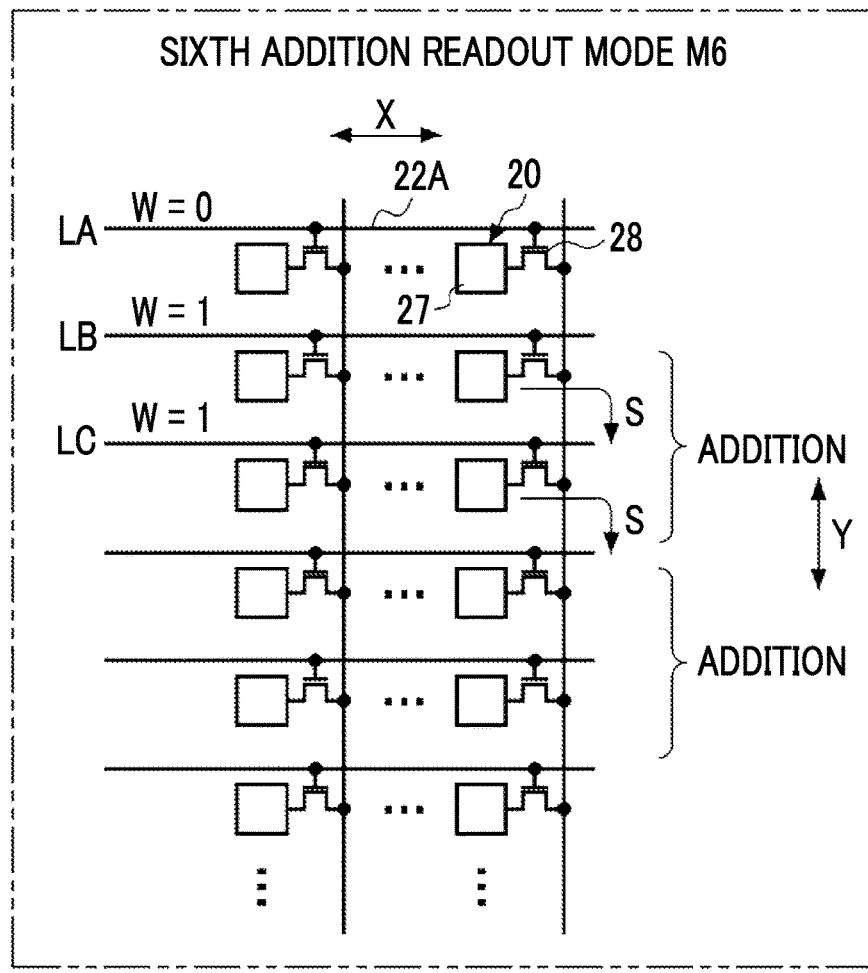
FIG. 20 is a diagram showing a sixth addition readout mode.
FIG. 21 is a diagram showing a table in which peripheral principal ray angles are associated with each other.

FIG. 20 is a diagram showing a sixth addition readout mode M6. The sixth addition readout mode M6 is a two-pixel addition readout method similarly to the fifth addition readout mode M5, but the set row is different from that of the fifth addition readout mode M5.

In the sixth addition readout mode M6, the main controller 40 performs addition readout with the B pixel line LB and the C pixel line LC as a set in a case where Wa=0, Wb=1, and Wc=1. In such a case, the pixel signal S from the B pixel line LB and the pixel signal S from the C pixel line LC are added and averaged at a ratio of 1:1.

The main controller 40 selects the sixth addition readout mode M6 in a case where the value of the peripheral principal ray angle θp included in the lens information 35A is between the second peripheral principal ray angle θ2 and the third peripheral principal ray angle θ3. In the sixth addition readout mode M6, for example, by adding the pixel signal S of the first B pixel 1BL and the pixel signal S of the first C pixel 1CL, it is possible to obtain the pixel signal corresponding to the fifth peripheral principal ray angle θ5 represented by Expression (2).

$$\theta 5=(\theta 2+\theta 3)/2 \qquad (2)$$

As described above, by using the sixth addition readout mode M6, it is possible to appropriately perform focusing control even in a case where the imaging lens 12 having the peripheral principal ray angle θp between the second peripheral principal ray angle θ2 and the third peripheral principal ray angle θ3 is attached to the body 11.

In the fifth addition readout mode M5 and the sixth addition readout mode M6, the two pixel signals are added at a ratio of 1:1, but can also be added at another ratio such as 1:2. As described above, an imaging apparatus capable of performing pixel addition at a ratio other than 1:1 is known, for example, in JP2015-128215A.

For example, by setting Wa=1 and Wb=2 in the fifth addition readout mode M5, it is possible to acquire the pixel signal corresponding to the sixth peripheral principal ray angle θ6 represented by Expression (3), from the first A pixel 1AL and the first B pixel 1BL.

$$\theta 6=(\theta 1+2\times\theta 2)/3 \qquad (3)$$

In such a manner, by changing the ratio of the weights Wa, Wb, and We in the fifth addition readout mode M5 and the sixth addition readout mode M6, it is possible to perform focusing control appropriately corresponding to various peripheral principal ray angles θp.

In each of the above-mentioned embodiments, three types of pixel lines, the A pixel line LA, the B pixel line LB, and the C pixel line LC, are provided as the pixel lines including the phase difference pixels F, but four or more types of the pixel lines may be provided. Further, at least two types of pixel lines including the phase difference pixels F may be provided.

Further, in each of the above-mentioned embodiments, the phase difference pixels F which are included in the first phase difference pixel group F1 and the phase difference pixels F which are included in the second phase difference pixel group F2 are disposed with two imaging pixels interposed therebetween N in the X direction, but both may be adjacent to each other. Further, it is preferable that the phase difference pixels F which are included in the first phase difference pixel group F1 and the phase difference pixels F which are included in the second phase difference pixel group F2 are disposed with three or less imaging pixels N interposed therebetween.

Further, in each of the above-mentioned embodiments, the phase difference pixel F corresponding to the first optical characteristic, the phase difference pixel F corresponding to the second optical characteristic, and the phase difference pixel F corresponding to the third optical characteristic are respectively disposed to be divided into the A pixel line LA, the B pixel line LB, and the C pixel line LC. The phase difference pixels F corresponding to these plurality of optical characteristics may be mixedly disposed in one pixel line.

Further, in each of the above-mentioned embodiments, the pixel lines including the phase difference pixels F extend in the X direction, but may be configured to extend in the Y direction. In such a case, the above-mentioned addition readout may be performed along the X direction instead of the Y direction. As described above, a configuration for performing addition readout in the X direction (horizontal direction) is known, for example, in JP2015-128215A.

Further, in each of the above-mentioned embodiments, addition is performed on two adjacent pixels in the addition readout mode, but addition readout may be performed on two pixels disposed with at least one pixel interposed in the X direction or the Y direction. As described above, a configuration in which addition readout is performed for two separated pixels is known, for example, in JP2015-128215A.

Further, in each of the above-mentioned embodiments, the main controller 40 selects the addition readout mode on the basis of the peripheral principal ray angle which is the principal ray angle in the peripheral region of the pixel region 21, but may select the addition readout mode on the basis of the angle of the principal ray incident on a region other than the peripheral region of the pixel region 21.

Third Embodiment

Next, a third embodiment of the present disclosure will be described. In the first embodiment, the main controller 40 selects the addition readout mode on the basis of the principal ray angle information included in the lens information 35A acquired from the imaging lens 12. In the third embodiment, the main controller 40 selects the addition readout mode on the basis of the focal length of the imaging lens 12. Other configurations of the imaging apparatus of the third embodiment are the same as the configurations of the imaging apparatus 10 of the first embodiment.

In the third embodiment, the lens information 35A stored in the memory 35 of the imaging lens 12 includes information about the focal length peculiar to the imaging lens 12. As shown in FIG. 21, for example, the main controller 40 stores a table TB in which the focal length and the peripheral principal ray angle θp are associated with each other. Generally, the peripheral principal ray angle θp approaches 0 as the focal length becomes longer. The main controller 40 may store a relationship between the focal length and the peripheral principal ray angle θp through a function instead of the table TB.

After acquiring the lens information 35A from the imaging lens 12 attached to the body 11, the main controller 40 acquires the peripheral principal ray angle θp corresponding to the focal length included in the lens information 35A by referring to the table TB. Then, the main controller 40 selects the addition readout mode on the basis of the acquired peripheral principal ray angle θp by the same method as in the first embodiment (refer to FIG. 18).

According to the present embodiment, even in a case where the imaging lens 12 whose principal ray information is not included in the lens information 35A is attached to the body 11, it is possible to perform focusing control using the pixel signals of appropriate phase difference pixels.

Fourth Embodiment

Next, a fourth embodiment of the present disclosure will be described. In each of the above-mentioned embodiments, the imaging lens 12 is a single focus lens, but in the fourth embodiment, the imaging lens 12 is a zoom lens whose focal length can be changed. Further, the imaging apparatus of the fourth embodiment may be an integrated digital camera in which the imaging lens 12 and the body 11 are inseparably connected. Other configurations of the imaging apparatus of the fourth embodiment are the same as the configurations of the imaging apparatus 10 of the first embodiment.

In the imaging apparatus of the fourth embodiment, the focal length can be changed (that is, the zoom magnification can be changed) by operating the zoom ring (not shown) provided on the imaging lens 12 or the instruction key 16. In the fourth embodiment, as in the third embodiment, the main controller 40 maintains the relationship between the focal length and the peripheral principal ray angle θp. The main controller 40 selects the addition readout mode by the same method as in the third embodiment in accordance with the change of the focal length by the zoom operation.

In a case where the zoom operation is performed during the motion picture capturing and change processing of the addition readout mode is constantly performed in conjunction with the zoom operation, a motion picture that gives the user a sense of discomfort may be generated. Therefore, it is preferable to select the addition readout mode (that is, change the weight) in a case where the focal length is changed by the zoom operation and the change of the focal length is stopped.

Figure 22:
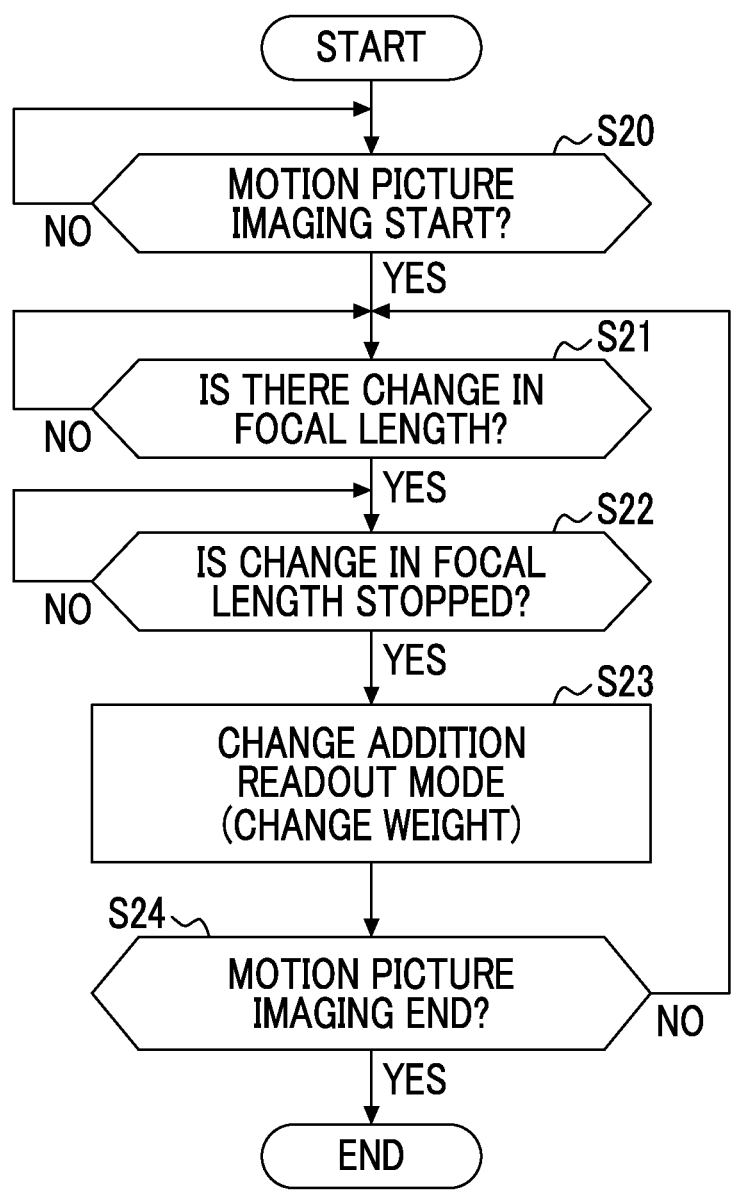
FIG. 22 is a flowchart showing weight change processing according to a fourth embodiment.

For example, the main controller 40 performs weight change processing according to the procedure shown in FIG. 22. First, in step S20, the main controller 40 determines whether or not motion picture capturing has started. In a case where the main controller 40 determines that the motion picture capturing has started (step S20: YES), the processing advances to step S21.

In step S21, the main controller 40 determines whether or not the focal length has been changed by the zoom operation. In a case where the main controller 40 determines that the focal length has been changed (step S21: YES), the processing advances to step S22. In step S22, the main controller 40 determines whether or not the change of the focal length has stopped. In a case where the main controller 40 determines that the change of the focal length has stopped (step S22: YES), the processing advances to step S23. In step S23, the main controller 40 changes the addition readout mode by selecting a weight according to the focal length at a time point at which the change of the focal length is stopped.

In the next step S24, the main controller 40 determines whether or not the motion picture capturing has stopped. In a case where the main controller 40 determines that the motion picture capturing has not stopped (step S24: NO), the processing returns to step S21. That is, in a case where the motion picture capturing is not stopped, the main controller 40 repeatedly executes steps S21 to S24. Then, in a case where the main controller 40 determines that the motion picture capturing has stopped (step S24: YES), the main controller 40 ends the change processing.

The change processing of the present embodiment is not limited to the time of motion picture capturing, but can also be performed during the display of the live view image performed in the preparatory stage of still image capturing.

Fifth Embodiment

Next, a fifth embodiment of the present disclosure will be described. In the fifth embodiment, even in a case where it is difficult to acquire the lens information 35A (that is, the optical characteristic) from the imaging lens 12, it is possible to select a pixel line including the phase difference pixels F suitable for the optical characteristics of the imaging lens 12. Other configurations of the imaging apparatus of the fifth embodiment are the same as the configurations of the imaging apparatus 10 of the first embodiment.

In the fifth embodiment, in a case where the optical characteristics are unlikely to be acquired from the imaging lens 12, the main controller 40 determines a weight of the addition readout, on the basis of the exposure amount to the phase difference pixels F which are included in the first phase difference pixel group F1 and the phase difference pixels F which are included in the second phase difference pixel group F2.

Figure 23:
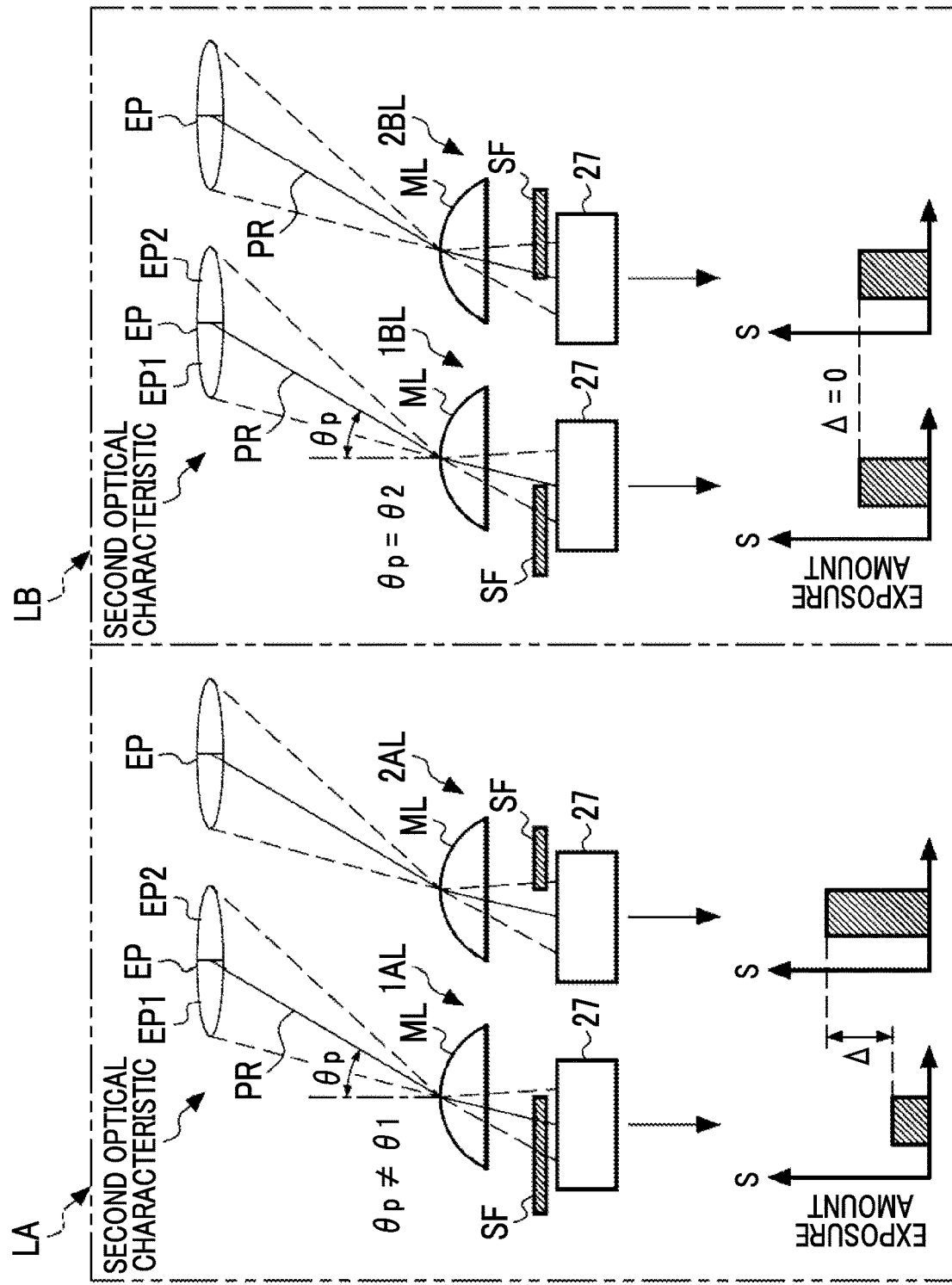
FIG. 23 is a diagram showing differences in exposure amount of phase difference pixels caused by differences in optical characteristics.

FIG. 23 shows differences in the exposure amount between the first A pixel 1AL and the second A pixel 2AL and between the first B pixel 1BL and the second B pixel 1BL with respect to a certain optical characteristic of the imaging lens 12. FIG. 23 shows the principal ray PR in a case where the imaging lens 12 having the second optical characteristic shown in FIG. 14 is attached to the body 11.

The first A pixel 1AL and the second A pixel 2AL are phase difference pixels F disposed on the A pixel line LA, and correspond to the peripheral principal ray angle θ1 of the first optical characteristic (refer to FIG. 13). Therefore, in a case where the principal ray PR of the second optical characteristic is incident on the first A pixel 1AL and the second A pixel 2AL, the peripheral principal ray angle θp of the incident light is different from the corresponding peripheral principal ray angle θ1. Therefore, there is a difference in both exposure amounts. Here, the exposure amount corresponds to the magnitude of the pixel signal S.

Specifically, in the first A pixel 1AL, the light blocking layer SF blocks the luminous flux from the exit pupil EP2 and a part of the luminous flux from the exit pupil EP1. Therefore, the exposure amount is lower than the appropriate value. On the other hand, in the second A pixel 2AL, the light blocking layer SF blocks only a part of the luminous flux from the exit pupil EP1. Therefore, the light amount becomes greater than the appropriate value. Therefore, the exposure amount difference Δ occurs between the first A pixel 1AL which is a phase difference pixel F included in the first phase difference pixel group F1 and the second A pixel 2AL which is a phase difference pixel F included in the second phase difference pixel group F2.

The first B pixel 1BL and the second B pixel 2BL are phase difference pixels F disposed on the A pixel line LA, and correspond to the peripheral principal ray angle θ2 of the second optical characteristic (refer to FIG. 14). Therefore, in a case where the principal ray PR of the second optical characteristic is incident on the first A pixel 1AL and the second A pixel 2AL, the peripheral principal ray angle θp of the incident light matches the corresponding peripheral principal ray angle θ1. Therefore, the exposure amount difference Δ is 0. Therefore, the exposure amount difference Δ does not occur between the first B pixel 1BL which is a phase difference pixel F included in the first phase difference pixel group F1 and the second B pixel 2BL which is a phase difference pixel F included in the second phase difference pixel group F2.

As described above, the main controller 40 determines the weight of the addition readout so as to select the pixel line having the smallest exposure amount difference Δ on the basis of the exposure amount differences A between the phase difference pixels F which are included in the first phase difference pixel group F1 and the phase difference pixels F which are included in the second phase difference pixel group F2.

Figure 24:
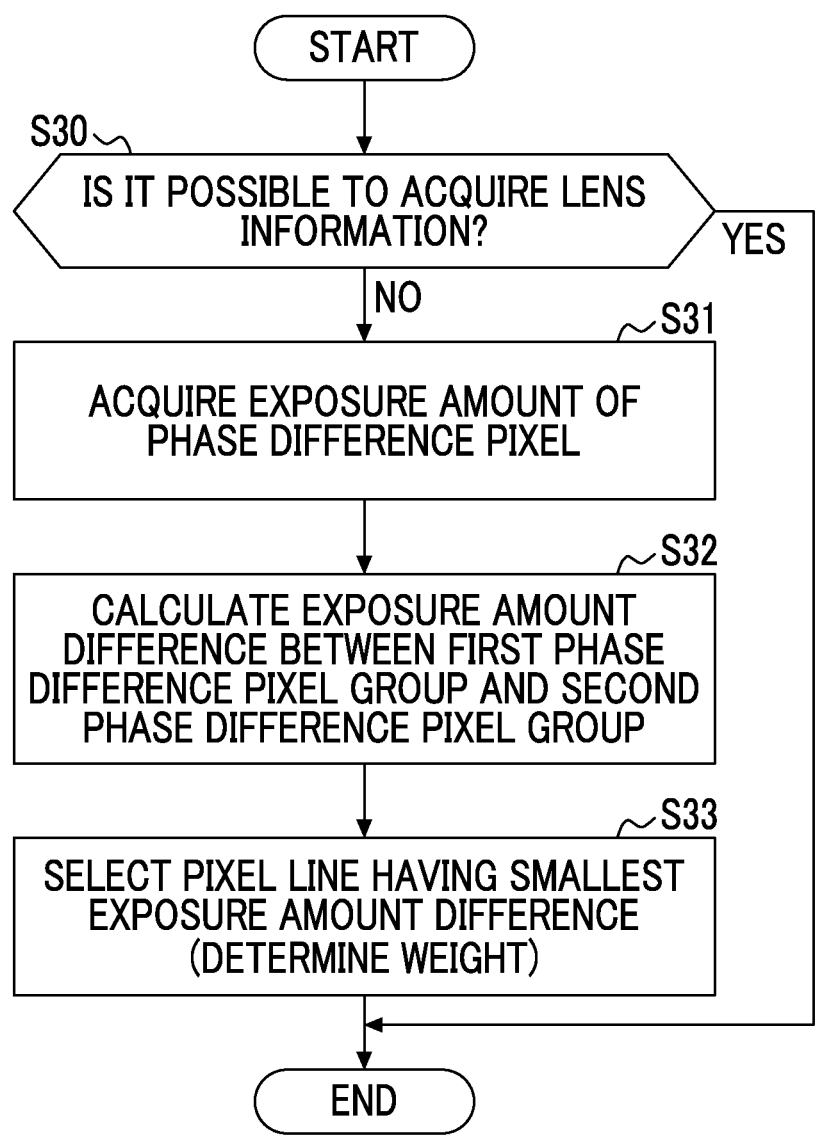
FIG. 24 is a flowchart showing weight determination processing according to a fifth embodiment.

The main controller 40 performs weight determination processing in the procedure shown in FIG. 24, for example. First, in step S30, the main controller 40 determines whether or not it is possible to acquire the lens information 35A from the imaging lens 12 in a case where the imaging lens 12 is attached to the body 11. In a case where it is possible to acquire the lens information 35A (step S30: YES), the main controller 40 ends the weight determination processing and determines the weight in the procedure shown in the first embodiment.

In a case where the main controller 40 is unable to acquire the lens information 35A (step S30: NO), the main controller 40 advances the processing to step S31. In step S31, the main controller 40 acquires the pixel signal S from, for example, the phase difference pixels F which are included in the first phase difference pixel group F1 and the second phase difference pixel group F2 in the first side region. At this time, it is preferable that the imaging sensor 20 captures an image under a uniform light amount.

In the next step S32, the main controller 40 obtains the exposure amount differences A between the phase difference pixels F which are included in the first phase difference pixel group F1 and the phase difference pixels F which are included in the second phase difference pixel group F2. The main controller 40 calculates, for example, each of an exposure amount difference Δ between the first A pixel 1AL and the second A pixel 2AL, an exposure amount difference Δ between the first B pixel 1BL and the second B pixel 2BL, and an exposure amount difference Δ between the first C pixel 1CL and the second C pixel 2CL.

In the next step S33, the main controller 40 determines the weight of addition readout so as to select a pixel line including the pair of phase difference pixels F having the smallest exposure amount difference Δ among the exposure amount differences A obtained in step S32. For example, in a case where the exposure amount difference Δ between the first B pixel 1BL and the second B pixel 2BL is the smallest, the weight is determined to be W1=1 and W0=W2=W3=0 so as to select the B pixel line LB (refer to FIG. 8). Thereby, the second addition readout mode M2 is selected.

Thereby, the main controller 40 ends the weight determination processing. After that, in a case where the motion picture capturing is started, the main controller 40 reads out the pixel signal S using the addition readout mode determined in step S33.

In the third embodiment, in a case where the optical characteristics of the imaging lens 12 are unlikely to be acquired, the weight is determined on the basis of the exposure amount of the phase difference pixel F, but a default weight may be selected. For example, in a case where the optical characteristics of the imaging lens 12 are unlikely to be acquired, the main controller 40 determines the weights of W1=1 and W0=W2=W3=0 so as to select the B pixel line LB including the first B pixel 1BL and the second B pixel 2BL having the same light blocking area (opening amount) (refer to FIG. 8). Thereby, the second addition readout mode M2 is selected.

The first B pixel 1BL and the second B pixel 2BL have the same light blocking area, and thus are most suitable in a case where the optical characteristics of the imaging lens 12 are unknown. Thereby, it is possible to cope with a situation in which the optical characteristics of the imaging lens 12 are unlikely to be acquired and the imaging for determining the weight is unlikely to be performed.

In each of the above-mentioned embodiments, the microlens ML is shifted from the center of the photoelectric conversion element 27 in accordance with the image height H, but in the technique of the present disclosure, it is not essential to shift the microlens ML.

In each of the above-mentioned embodiments, various processors shown below can be used as the hardware structure of the controller using the main controller 40 as an example. In addition to the CPU which is a general-purpose processor that functions by executing software (programs), the above-mentioned various processors include PLD such as FPGA which is a processor whose circuit configuration can be changed after manufacturing, a dedicated electric circuit such as ASIC which is a processor having a circuit configuration specially designed for executing specific processing, and the like.

The controller may be constituted of one of the various processors, or may be constituted of a combination of two or more processors of the same type or different types (for example, a combination of a plurality of FPGAs or a combination of a CPU and an FPGA). Further, the plurality of controllers may be constituted of one processor.

As an example of the plurality of controllers constituted of one processor, first, as represented by computers such as a client and a server, there is a form in which one processor is constituted of a combination of one or more CPUs and software and this processor functions as a plurality of controllers. Secondly, as typified by system on chip (SOC), there is a form in which a processor that realizes the functions of the whole system including a plurality of controllers with one IC chip is used. As described above, the controller can be configured by using one or more of the above-mentioned various processors as a hardware-like structure.

Further, as the hardware structure of these various processors, more specifically, it is possible to use an electric circuit in which circuit elements such as semiconductor elements are combined.

The contents described and illustrated above are detailed descriptions of the parts relating to the technique of the present disclosure, and are merely examples of the technique of the present disclosure. For example, the above description of the configuration, function, effect, and advantage is an example of the configuration, function, effect, and advantage of a portion relating to the technique of the present disclosure. Therefore, it is needless to say that unnecessary parts may be deleted, new elements may be added, or replacements may be made in the described contents and illustrated contents shown above without departing from the technical scope of the present disclosure. In addition, in order to avoid complications and facilitate understanding of the parts relating to the technique of the present disclosure, in the description contents and the illustrated contents shown above, the description about common technical knowledge and the like which require special explanation in order to enable the implementation of the technique of the present disclosure is not given.

All documents, patent applications, and technical standards described in the present specification are incorporated into the present specification by reference to the same extent as in a case where the individual documents, patent applications, and technical standards were specifically and individually stated to be incorporated by reference.

What is claimed is:

1. An imaging apparatus comprising:
   a pixel region in which a plurality of pixels are arranged and into which light is incident through an imaging lens; and
   a controller that controls readout of a pixel signal from the pixel region,
   wherein in the pixel region, phase difference pixels, each of which includes a photoelectric conversion element, and a light blocking layer, which blocks a part of light incident on the photoelectric conversion element, are arranged along a first direction, in a case where one side in the first direction is set as a first side and the other side is set as a second side, the pixel region includes a first phase difference pixel group including a plurality of the phase difference pixels of which the first side of the photoelectric conversion element is blocked by the light blocking layer in a first side region of the first side, and a second phase difference pixel group including a plurality of the phase difference pixels of which the second side of the photoelectric conversion element is blocked by the light blocking layer, and the first phase difference pixel group includes a first A pixel and a first B pixel in which a light blocking area of the photoelectric conversion element using the light blocking layer is smaller than that of the first A pixel, and the controller performs addition readout processing in which at least one of a pixel signal of the first A pixel or a pixel signal of the first B pixel is weighted in accordance with optical characteristics of the imaging lens.

2. The imaging apparatus according to claim 1,
wherein the second phase difference pixel group includes a second A pixel and a second B pixel in which a light blocking area of the photoelectric conversion element using the light blocking layer is larger than that of the second A pixel, and the controller performs addition readout processing in which either one of a set of the first A pixel and the second A pixel or a set of the first B pixel and the second B pixel is weighted in accordance with the optical characteristics of the imaging lens.

3. The imaging apparatus according to claim 1,
wherein the pixel region has
an A pixel line that includes the first A pixel and has a plurality of pixels arranged in the first direction, and
a B pixel line that includes the first B pixel and has a plurality of pixels arranged in the first direction,
the A pixel line and the B pixel line are arranged in a second direction intersecting with the first direction, and
the controller performs addition readout processing in which either one of the A pixel line or the B pixel line is weighted in accordance with the optical characteristics of the imaging lens.

4. The imaging apparatus according to claim 3,
wherein the first phase difference pixel group is also included in a central region located at a center of the pixel region with respect to the first direction,
in the A pixel line, a light blocking area of the first A pixel which is included in the first side region is larger than a light blocking area of the first A pixel which is included in the central region, and
in the B pixel line, a light blocking area of the first B pixel which is included in the first side region is equal to a light blocking area of the first B pixel which is included in the central region.

5. The imaging apparatus according to claim 4, wherein the light blocking area of a plurality of the first A pixels which are included in the A pixel line is smaller at a position closer to the central region than the first side region.

6. The imaging apparatus according to claim 3, wherein the A pixel line and the B pixel line are adjacent to each other in the second direction.

7. The imaging apparatus according to claim 3,
wherein in the pixel region, the phase difference pixels which are included in the first phase difference pixel group are formed in a second side region on the second side, and
in the A pixel line, a light blocking area of the first A pixel which is included in the second side region is smaller than a light blocking area of the first A pixel which is included in the first side region.

8. The imaging apparatus according to claim 1, wherein the optical characteristics are an incidence angle of the light with respect to the pixel region, a focal length of the imaging lens, or a zoom magnification of the imaging lens.

9. The imaging apparatus according to claim 8,
wherein the focal length of the imaging lens can be changed, and
the controller changes the weight in a case where the focal length is changed and the change is stopped.

10. The imaging apparatus according to claim 8, wherein the controller acquires the optical characteristics from the imaging lens and determines the weight on the basis of the acquired optical characteristics.

11. The imaging apparatus according to claim 10, wherein in a case where the optical characteristics are unlikely to be acquired from the imaging lens, the controller determines the weight on the basis of an exposure amount of the light to the first A pixel and the first B pixel.

12. The imaging apparatus according to claim 2,
wherein the second phase difference pixel group includes the second A pixel and the second B pixel having the same light blocking area as the first B pixel, and
in a case where the optical characteristics of the imaging lens are unlikely to be acquired, the controller sets the weight for the set of the first A pixel and the second A pixel to zero.

13. The imaging apparatus according to claim 1, wherein the pixel region has
a gate line that extends in the first direction and selects the photoelectric conversion element which reads out the pixel signal, and
a signal line that extends in a second direction intersecting with the first direction and outputs a pixel signal from the photoelectric conversion element.

14. The imaging apparatus according to claim 1, wherein the addition readout processing includes thinning-out readout processing in which the weight is set to zero so that a pixel signal having a weight of zero is thinned out and a pixel signal whose weighting is not zero is read out.

15. An imaging sensor comprising:
a pixel region in which a plurality of pixels are arranged,
wherein in the pixel region, phase difference pixels, each of which includes a photoelectric conversion element, and a light blocking layer, which blocks a part of light incident on the photoelectric conversion element, are arranged along a first direction, and
in a case where one side in the first direction is set as a first side and the other side is set as a second side,
the pixel region includes a first phase difference pixel group including a plurality of the phase difference pixels of which the first side of the photoelectric conversion element is blocked by the light blocking layer in a first side region of the first side, and a second phase difference pixel group including a plurality of the phase difference pixels of which the second side of the photoelectric conversion element is blocked by the light blocking layer, and
the first phase difference pixel group includes a first A pixel and a first B pixel in which a light blocking area of the photoelectric conversion element using the light blocking layer is smaller than that of the first A pixel, and the second phase difference pixel group includes a second A pixel and a second B pixel in which a light blocking area of the photoelectric conversion element using the light blocking layer is larger than that of the second A pixel.

16. The imaging sensor according to claim 15, wherein the pixel region includes an imaging pixel having a color filter and the photoelectric conversion element, the first A pixel and the second A pixel are arranged such that three or less of the imaging pixels are interposed therebetween, and the first B pixel and the second B pixel are arranged such that three or less of the imaging pixels are interposed therebetween.

17. The imaging sensor according to claim 15, wherein the pixel region has an A pixel line that includes the first A pixel and has a plurality of pixels arranged in the first direction, and a B pixel line that includes the first B pixel and has a plurality of pixels arranged in the first direction, and the A pixel line and the B pixel line are arranged in a second direction intersecting with the first direction.

18. The imaging sensor according to claim 15, wherein the first phase difference pixel group and the second phase difference pixel group are also arranged in a second side region on the second side of the pixel region, in the second side region, a light blocking area of the first A pixel is smaller than a light blocking area of the first B pixel, and in the second side region, a light blocking area of the second A pixel is larger than a light blocking area of the second B pixel.

19. The imaging sensor according to claim 15, wherein in the first side region, the first phase difference pixel group includes a first C pixel in which a light blocking area of the photoelectric conversion element using the light blocking layer is smaller than that of the first B pixel, and in the first side region, the second phase difference pixel group includes a second C pixel in which a light blocking area of the photoelectric conversion element using the light blocking layer is larger than that light blocking area of the second B pixel.

20. The imaging sensor according to claim 15, wherein the pixel region has a gate line that extends in the first direction and selects the photoelectric conversion element which reads out a pixel signal, and a signal line that extends in a second direction intersecting with the first direction and outputs the pixel signal from the photoelectric conversion element.

* * * * *